(12) United States Patent
Morales et al.

(10) Patent No.: US 11,247,104 B2
(45) Date of Patent: Feb. 15, 2022

(54) GOLF CLUB FACE PLATES WITH INTERNAL CELL LATTICES AND RELATED METHODS

(71) Applicant: KARSTEN MANUFACTURING CORPORATION, Phoenix, AZ (US)

(72) Inventors: Eric J. Morales, Laveen, AZ (US); Erik M. Henrikson, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

(21) Appl. No.: 16/989,747

(22) Filed: Aug. 10, 2020

(65) Prior Publication Data
US 2020/0368588 A1 Nov. 26, 2020

Related U.S. Application Data

(60) Continuation of application No. 16/405,904, filed on May 7, 2019, now Pat. No. 10,737,147, which is a continuation of application No. 15/859,912, filed on Jan. 2, 2018, now Pat. No. 10,322,320, which is a division of application No. 15/162,482, filed on May 23, 2016, now Pat. No. 9,889,347, which is a
(Continued)

(51) Int. Cl.
| | |
|---|---|
| *A63B 53/04* | (2015.01) |
| *B23K 20/02* | (2006.01) |
| *B32B 3/12* | (2006.01) |
| *B23K 20/233* | (2006.01) |
| *B23K 103/14* | (2006.01) |

(52) U.S. Cl.
CPC .......... *A63B 53/04* (2013.01); *A63B 53/0466* (2013.01); *B23K 20/021* (2013.01); *B23K 20/023* (2013.01); *B23K 20/233* (2013.01); *B32B 3/12* (2013.01); *A63B 53/042* (2020.08); *A63B 53/047* (2013.01); *A63B 53/0408* (2020.08); *A63B 53/0425* (2020.08); *A63B 53/0429* (2020.08); *A63B 53/0454* (2020.08); *A63B 53/0458* (2020.08); *A63B 53/0462* (2020.08); *A63B 53/0487* (2013.01); *A63B 2209/00* (2013.01); *B23K 2103/14* (2018.08); *Y10T 29/49826* (2015.01)

(58) Field of Classification Search
CPC .............. A63B 53/0416; A63B 53/042; A63B 53/0425; A63B 53/0429; A63B 2209/00; B22F 10/20; B22F 10/28; B23K 20/021; B23K 20/233; B23K 20/23; B23K 2103/14; Y10T 29/49826; B33Y 10/00; B33Y 80/00; B23B 3/12
USPC .................................................. 473/324, 332
See application file for complete search history.

(56) References Cited

U.S. PATENT DOCUMENTS

| | | |
|---|---|---|
| 4,630,826 A | 12/1986 | Nishigaki et al. |
| 4,681,322 A | 7/1987 | Straza |

(Continued)

OTHER PUBLICATIONS

International Search Report and Written Opinion for PCT Application No. PCT/US2012/038689, 11 pages, dated Nov. 23, 2012.
(Continued)

*Primary Examiner* — John E Simms, Jr.

(57) ABSTRACT

Embodiments of golf club face plates with internal cell lattices are presented herein. Other examples and related methods are also disclosed herein.

16 Claims, 14 Drawing Sheets

Related U.S. Application Data continuation-in-part of application No. 14/157,345, filed on Jan. 16, 2014, now Pat. No. 9,409,065, which is a continuation of application No. 13/352,086, filed on Jan. 17, 2012, now Pat. No. 8,663,027.

(60) Provisional application No. 62/293,914, filed on Feb. 11, 2016, provisional application No. 62/165,683, filed on May 22, 2015, provisional application No. 61/537,278, filed on Sep. 21, 2011.

(56) References Cited

U.S. PATENT DOCUMENTS

| | | | |
|---|---|---|---|
| 5,301,941 A | 4/1994 | Allen | |
| 5,362,055 A | 11/1994 | Rennie | |
| 5,377,986 A | 1/1995 | Viollaz et al. | |
| 5,425,538 A | 6/1995 | Vincent et al. | |
| 5,499,814 A * | 3/1996 | Lu | A63B 60/00 473/329 |
| 5,681,227 A | 10/1997 | Sayrizi | |
| 5,766,094 A * | 6/1998 | Mahaffey | A63B 53/04 473/342 |
| 5,827,131 A | 10/1998 | Mahaffey et al. | |
| 5,944,619 A | 8/1999 | Cameron | |
| 6,001,495 A | 12/1999 | Bristow et al. | |
| 6,074,309 A * | 6/2000 | Mahaffey | A63B 53/047 473/342 |
| 6,114,050 A | 9/2000 | Westre et al. | |
| RE36,950 E | 11/2000 | Allen | |
| 6,183,381 B1 | 2/2001 | Grant et al. | |
| 6,240,640 B1 | 6/2001 | Matsuoka et al. | |
| 6,319,150 B1 | 11/2001 | Werner et al. | |
| 6,334,818 B1 | 1/2002 | Cameron | |
| 6,932,716 B2 | 8/2005 | Ehlers | |
| 6,986,715 B2 | 1/2006 | Mahaffey et al. | |
| 7,108,614 B2 | 9/2006 | Lo | |
| 7,112,147 B2 | 9/2006 | Solheim | |
| 7,281,990 B2 | 10/2007 | Hagood et al. | |
| 7,367,898 B2 | 5/2008 | Hawkins et al. | |
| 7,367,899 B2 | 5/2008 | Rice et al. | |
| 7,461,726 B2 | 12/2008 | Hawkins et al. | |
| 7,500,923 B2 | 3/2009 | Tateno | |
| 7,527,565 B1 | 5/2009 | Ehlers et al. | |
| 7,708,653 B2 | 5/2010 | Hawkins et al. | |
| 7,794,335 B2 | 9/2010 | Cole | |
| 7,846,039 B2 | 12/2010 | Gilbert et al. | |
| 7,874,936 B2 | 1/2011 | Chao | |
| 7,946,929 B2 | 5/2011 | Wahlin | |
| 8,007,373 B2 | 8/2011 | Soracco et al. | |
| 8,323,122 B2 | 12/2012 | Soracco et al. | |
| 8,663,027 B2 | 3/2014 | Morales et al. | |
| 8,777,778 B2 | 7/2014 | Solheim | |
| 8,790,196 B2 | 7/2014 | Solheim | |
| 9,194,452 B2 | 11/2015 | Hawkins | |
| 9,216,327 B2 | 12/2015 | Morin | |
| 9,330,406 B2 | 5/2016 | Soracco et al. | |
| 2002/0019265 A1* | 2/2002 | Allen | A63B 53/0466 473/329 |
| 2002/0037776 A1 | 3/2002 | Krumme | |
| 2004/0009829 A1* | 1/2004 | Kapilow | A63B 53/04 473/342 |
| 2004/0082405 A1 | 4/2004 | Kobe-shi | |
| 2007/0054751 A1* | 3/2007 | Breier | A63B 53/0466 473/334 |
| 2013/0072321 A1* | 3/2013 | Morales | A63B 60/00 473/342 |
| 2013/0097050 A1* | 4/2013 | Soracco | A63B 53/047 705/26.5 |
| 2014/0038737 A1* | 2/2014 | Roach | A63B 60/00 473/226 |
| 2014/0274459 A1* | 9/2014 | Kronenberg | A63B 53/047 473/342 |
| 2014/0277671 A1* | 9/2014 | Kronenberg | B23K 15/0086 700/106 |
| 2015/0065266 A1 | 3/2015 | Morin | |
| 2015/0306474 A1* | 10/2015 | Breier | A63B 53/0466 473/332 |
| 2016/0263449 A1* | 9/2016 | Morales | B23K 20/021 |
| 2020/0016461 A1* | 1/2020 | Spackman | A63B 53/0466 |

OTHER PUBLICATIONS

International Searh Report for PCT Application No. PCT/US2016/033822, 2 pages, dated Aug. 19, 2016.

* cited by examiner

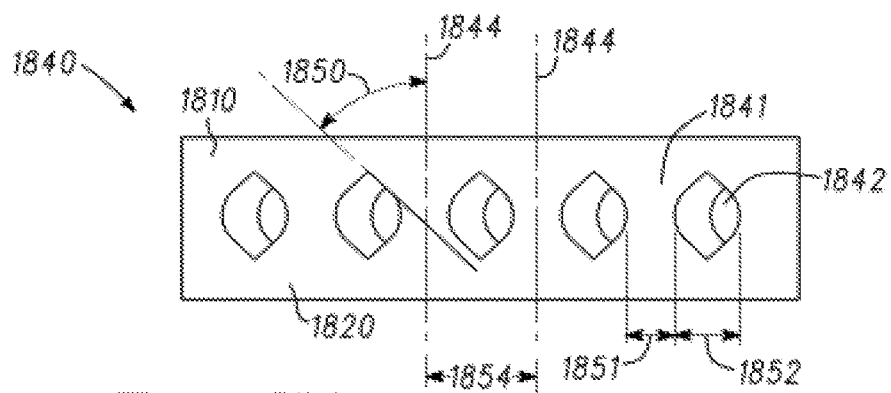
Fig. 27
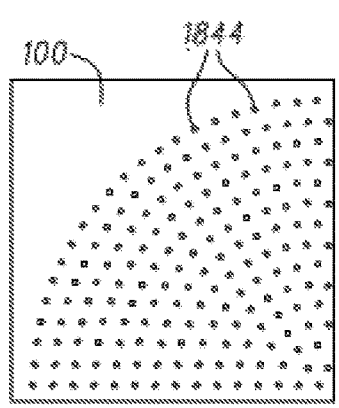 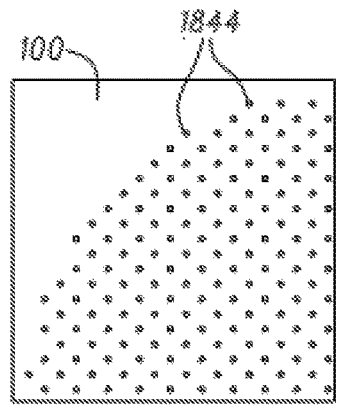 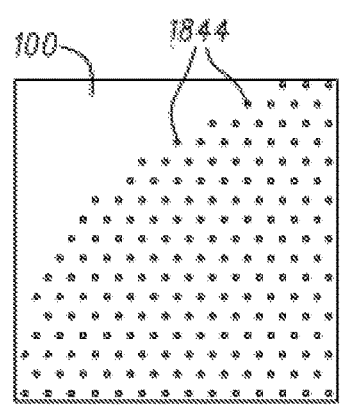
Fig. 28A　　Fig. 28B　　Fig. 28C

GOLF CLUB FACE PLATES WITH INTERNAL CELL LATTICES AND RELATED METHODS

CROSS-REFERENCE TO RELATED APPLICATIONS

This is a continuation of U.S. patent application Ser. No. 16/405,904, filed May 7, 2019, which is a continuation of U.S. patent application Ser. No. 15/859,912, filed Jan. 2, 2018, now U.S. Pat. No. 10,322,320 issued Jun. 18, 2019, which is a divisional of U.S. patent application Ser. No. 15/162,482, filed on May 23, 2016, now U.S. Pat. No. 9,889,347, issued Feb. 13, 2018, which claims the benefit of U.S. Provisional Patent Application No. 62/293,914, filed on Feb. 11, 2016, and U.S. Provisional Patent Application No. 62/165,683, filed on May 22, 2015, and is a continuation-in-part of U.S. patent application Ser. No. 14/157,345, filed on Jan. 16, 2014, now U.S. Pat. No. 9,409,065, which is a continuation of U.S. patent application Ser. No. 13/352,086, filed on Jan. 17, 2012, now U.S. Pat. No. 8,663,027, which claims the benefit of U.S. Provisional Patent Application No. 61/537,278, filed on Sep. 21, 2011, the contents of all which are incorporated fully herein by reference.

TECHNICAL FIELD

The present disclosure relates generally to sports equipment, and relates, more particularly, to golf club face plates with internal cell lattices and related methods.

BACKGROUND

The development of golf club head technology has been characterized in part by the desire to enhance playability characteristics while managing weight and mass location considerations. The ability to alter or redistribute mass at or around locations of high stress and/or of limited thickness in a golf club head, however, has to be balanced with respect to structural resilience considerations. Considering the above, further developments in terms of weight redistribution will advance the playability characteristics of golf club heads.

BRIEF DESCRIPTION OF THE DRAWINGS

The present disclosure will be better understood from a reading of the following detailed description of examples of embodiments, taken in conjunction with the accompanying figures in the drawings.

FIG. 27 illustrates a side view of a portion of a cell lattice of a face plate.

FIG. 28A illustrates a front cross sectional view of a portion of a face plate having a cell lattice according to one embodiment.

FIG. 28B illustrates a front cross sectional view of a portion of a face plate having a cell lattice according to one embodiment.

FIG. 28C illustrates a front cross sectional view of a portion of a face plate having a cell lattice according to one embodiment.

Figure 1:
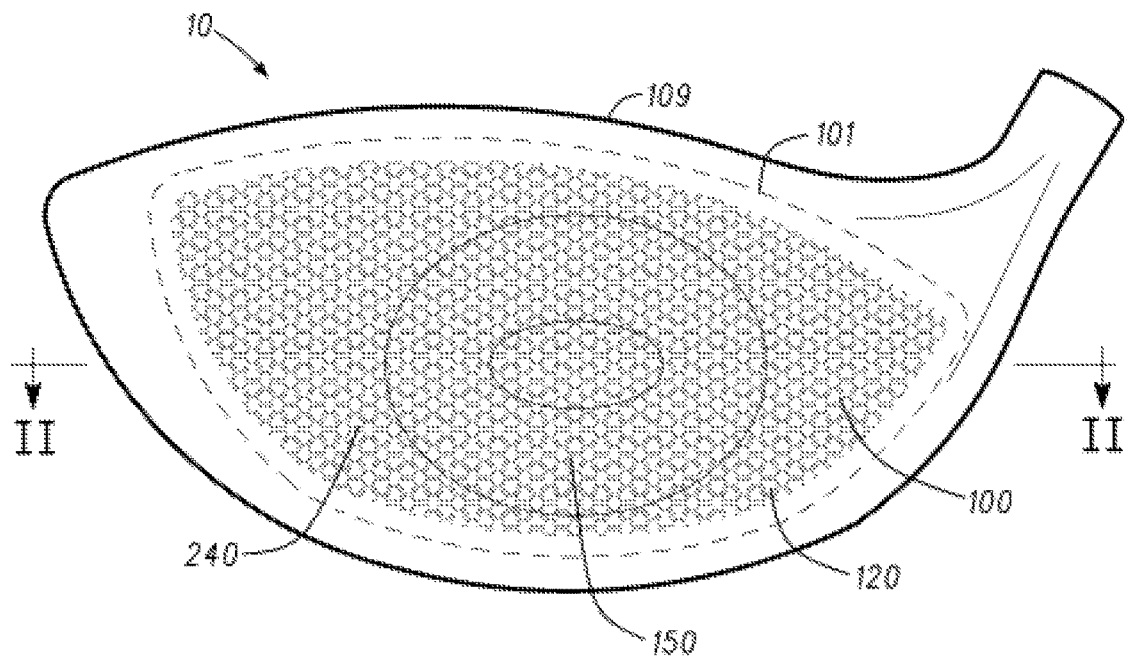
FIG. 1 illustrates a front perspective view of a golf club head comprising a face plate coupled to a club head body.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

DETAILED DESCRIPTION

In one embodiment, a method for providing a face plate for a golf club head can comprise providing an inner skin of the face plate, providing an outer skin of the face plate, providing a midsection of the face plate, and bounding the midsection between the inner skin and the outer skin. Providing the midsection can comprise providing a plurality of midsection layers comprising a first midsection layer and a second midsection layer, forming a first lattice pattern through the first midsection layer, and forming a second lattice pattern through the second midsection layer. Providing the inner skin, the outer skin, and the midsection can comprise providing each of the midsection, the inner skin, or the outer skin as separate distinct pieces. Bounding the midsection can comprise diffusion bonding the inner skin, the midsection, and the outer skin together, including the first and second midsection layers, into a single integral piece of material that is substantially seamless between the inner skin and the midsection and between the midsection and the outer skin. After the diffusion bonding, a midsection central area of the midsection can comprise a cell lattice, the cell lattice can comprise a plurality of walls defining a plurality of cells in a hexagonal pattern, the plurality of walls and the plurality of cells of the cell lattice can be defined at least in part by the first and second lattice patterns, the cell lattice can be fully bounded between the inner and outer skins of the face plate, and a midsection perimeter area of the midsection can bound the midsection central area and can be devoid of the cell lattice. Forming the first lattice pattern through the first midsection layer can comprise forming a first cutout through the first midsection layer, the first cutout configured to define a first volume portion of a first cell of the cell lattice. Forming the second lattice pattern through the second midsection layer can comprise forming a second cutout through the second midsection layer, the second cutout configured to define a second volume portion of the first cell. Bounding the midsection can comprise aligning the second midsection layer over the first midsection layer such that the first and second cutouts are centered about a first cell axis of the first cell.

In one embodiment, a method for providing a face plate for a golf club head can comprise providing an inner skin of the face plate, providing an outer skin of the face plate, providing a midsection of the face plate, and coupling the midsection between the inner skin and the outer skin such that an inner midsection end of the midsection is coupled to the inner skin of the face plate, and such that an outer midsection end of the midsection is coupled to the outer skin of the face plate. Providing the midsection can comprise providing a cell lattice in the midsection, the cell lattice comprising a plurality of walls defining a plurality of cells.

In one embodiment, a face plate for a golf club head can comprise an inner skin, an outer skin, and a midsection. The midsection can comprise an inner midsection end coupled to the inner skin, an outer midsection end coupled to the outer skin, and a cell lattice comprising a plurality of walls defining a plurality of cells between the inner midsection end and the outer midsection end.

Other examples and embodiments are further disclosed herein. Such examples and embodiments may be found in the figures, in the claims, and/or in the present description.

Figure 2:
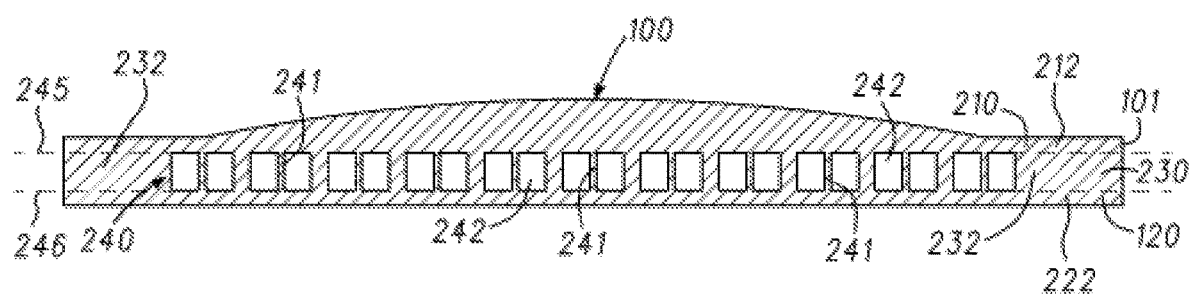
FIG. 2 illustrates a cross-sectional view of the face plate of FIG. 1, cut along line II-II.

Turning to the drawings, FIG. 1 illustrates a front perspective view of golf club head 10 comprising face plate 100 coupled to club head body 109. FIG. 2 illustrates a cross-sectional view of face plate 100 cut along line II-II of FIG. 1. As can be seen in FIG. 2, face plate 100 comprises inner skin 210, outer skin 120, and midsection 230 between inner skin 210 and outer skin 120, where midsection 230 comprises cell lattice 240 having walls 241 defining cells 242. In the present example, cell lattice 240 extends from inner midsection end 245 (where cell lattice 240 is coupled to inner skin 210), to outer midsection end 246 (where cell lattice 240 is coupled to inner skin 210). Cell lattice 240 is thus fully encapsulated within faceplate 100 in the present example, between inner skin 120 and outer skin 210, and by perimeter midsection area 232. Although inner midsection end 245 and outer midsection end 246 are represented along dotted lines in FIG. 2, in the present embodiment the interface between midsection 230 and inner skin 210 or outer skin 120 may be seamless or imperceptible visually and/or structurally.

The different portions of faceplate 100 can comprise different thicknesses. In the present example, the thickness of outer skin 120 is approximately 0.03 inches (approximately 0.08 millimeters (mm); the thickness of midsection 230 is approximately 0.07 inches (approximately 1.78 mm); and the thickness of inner skin varies, being approximately 0.05 inches (approximately 0.13 mm) towards the center, and approximately 0.03 inches (approximately 0.08 mm) towards the perimeter. The thickness of inner skin 210 is greater than the thickness of outer skin 120 in the present example, where inner skin 210 faces away from the impact surface of faceplate 100, to better distribute impact stresses throughout the faceplate. In some examples, the thickness of inner skin 210 and outer skin 120 can be substantially similar to each other, and/or may not vary.

Figure 5:
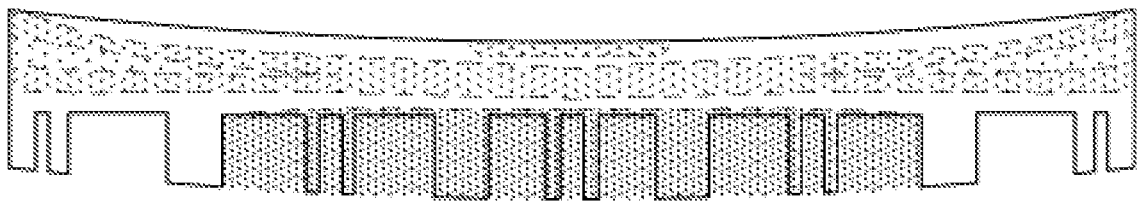
FIG. 5 illustrates a finite element analysis graphic showing uneven stress distribution detrimentally concentrated in and around void portions of an exposed cell lattice in an embodiment of a face plate lacking an inner skin layer.

In the present example, face plate 100 is shown with inner skin 210, outer skin 120, and midsection 230 merged together into a single integral piece of material. In some examples, inner skin 210, outer skin 120, and/or midsection 230 may be merged together without using adhesives or fasteners, such as via a high-pressure and/or high-heat process. In the same or other examples, such process may comprise a diffusion bonding process. The ability to combine midsection 230 between inner skin 210 and outer skin 120 and into a single integral piece of material can provide many benefits, such as a reduction in the weight of face plate 100 via cell lattice 240. In some examples, encapsulating cell lattice 240 within face plate 100 can permit weight savings of approximately 8% to approximately 25%. Such results can be achieved without compromising the strength or durability of face plate 100, and without introducing detrimental bending, elastic and/or flexing susceptibilities that would result from uneven stress distribution if, for example, face plate 100 were made with cell lattice 240 exposed and/or without one of inner skin 210 or outer skin 120. As an example, and skipping ahead in the figures, FIG. 5 illustrates a cross-sectional view of a finite element analysis graphic showing uneven stress distribution detrimentally concentrated, as denoted by the heavily-dotted center region, in and around the void portions of an exposed cell lattice in an embodiment comprising only a single skin coupled to the cell lattice.

Figure 3:
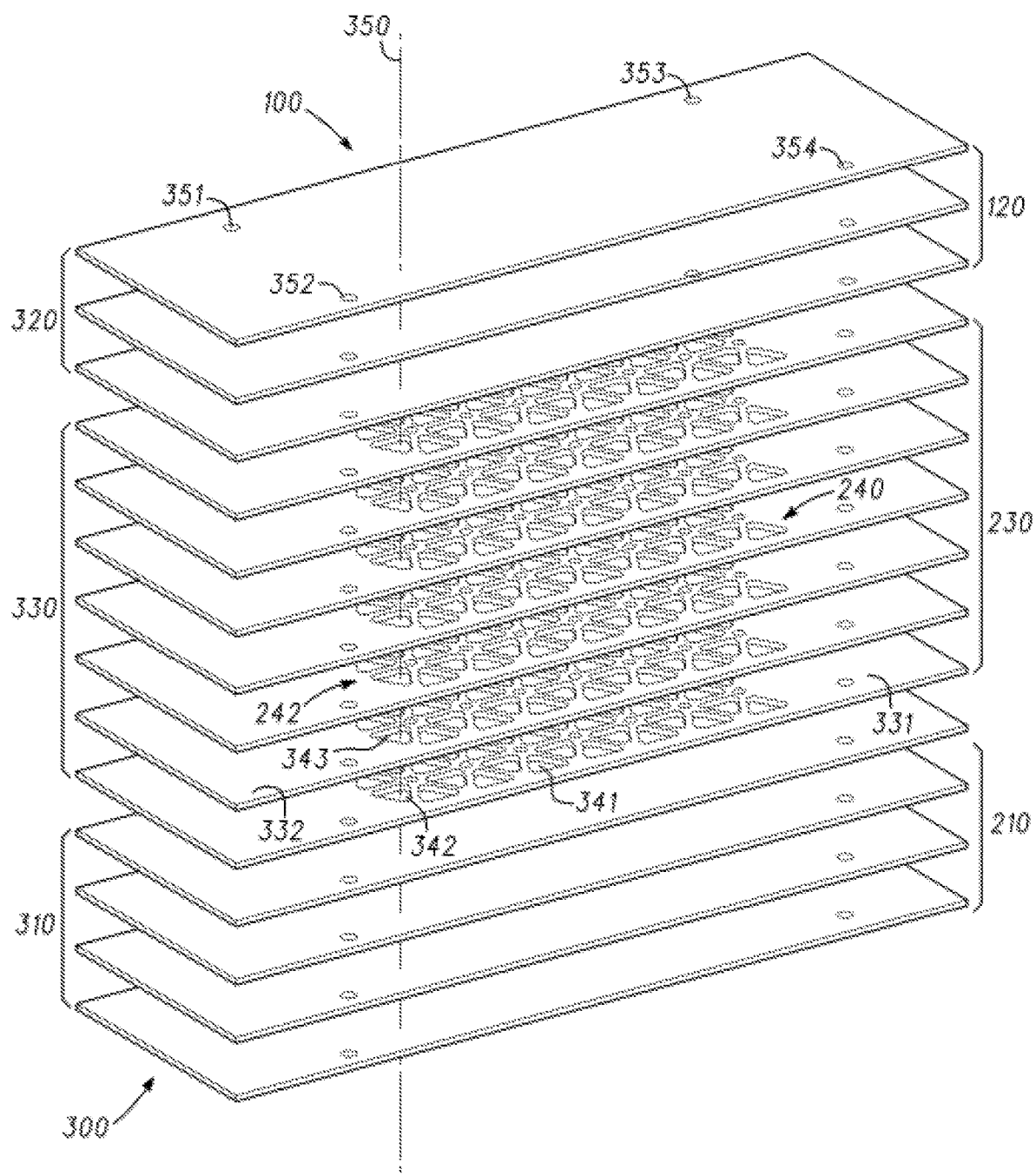
FIG. 3 illustrates a perspective view of portions of different layers comprising the face plate of FIG. 1 prior to being merged together.

Backtracking to FIG. 3, a perspective view is illustrated of portions of different layers 300 comprising face plate 100 prior to being merged together, including midsection layers 330. In the present example, midsection 230 comprises midsection layers 330 merged together into the single integral piece of material of face plate 100. In the same or other examples, the plurality of midsection layers 330 can be merged together via the high-pressure and high-heat process described above. As can be seen in FIG. 3, inner skin 210 and outer skin 120 can also be formed out of several layers, such as outer skin layers 320 and inner skin layers 310, which may be merged together into the single integral piece of material of face plate 100. Although in the present embodiment inner skin 210 comprises more inner skin layers 310 than outer skin 120 comprises outer skin layers 320, there can be other embodiments where such relationship is inverse, or where both skins comprise the same number of layers. There may be other embodiments, however, where one or more of inner skin 210, outer skin 120, and/or midsection 230 may originally comprise a single layer, rather than a plurality of layers coupled together.

Figure 4:
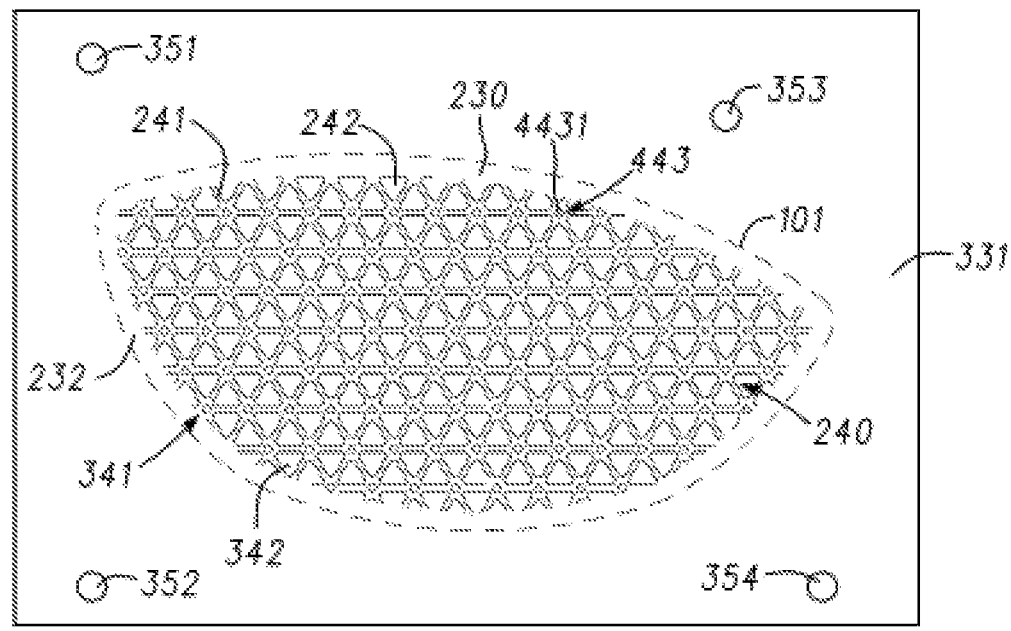
FIG. 4 illustrates a front view of a midsection layer of the face plate of FIG. 1, comprising a lattice pattern and alignment elements.

FIG. 3 shows portions of layers 300 as sheets of metallic material, and illustrate midsection layers 330 with representative cutouts configured to form cell lattice 240 when merged together. FIG. 4 illustrates a front view of midsection layer 331 of midsection 230, comprising lattice pattern 341 and alignment elements 351-354. Lattice pattern 341 comprises a plurality of cutouts, such as cutout 342, that define a layer portion of walls 241 and a layer portion of the volume of cells 242 of cell lattice 240. In some examples, cell lattice 240 may be formed by one or more processes, such as by machining and/or by chemically etching the cutouts of the different lattice patterns of midsection layers 330 prior to merging layers 300 (FIG. 3) together. In examples involving the machining of cell lattice 240 or one or more of its elements, such machining can be carried out via one or more techniques, such as through computer numerical control (CNC) machining, waterjet cutting, and/or electrical discharge machining.

Although in the present example the cutouts of lattice pattern 341 are all similar to each other, there can be other examples where the cutouts can have different geometries, different dimensions, such as different radiuses, different perimeter lengths, different areas, and/or different volumes. The same or other examples may comprise other patterns, such as a pattern where a density in the number of cells 242 decreases towards target strike region 150 of face plate 100, and/or a pattern where a size or dimension of cells 242 decreases towards target strike region 150 of face plate 100.

Referring to FIG. 4, alignment elements 351-354 of midsection layer 331 is representative of corresponding alignment elements in other ones of layers 300 (FIG. 3). Alignment elements 351-354 are configured so that respective alignment elements 351-354 of different ones of layers 300 will align with each other only in a single orientation when layers 300 are stacked as shown in FIG. 3. Thus, when alignment elements 351-354 are aligned with each other throughout layers 300, walls 241 and the different lattice patterns of midsection layers 330, such as lattice pattern 341, will also be aligned to yield cell lattice 240 (FIGS. 2-3) once layers 300 are merged together. In the present example, by aligning alignment elements 351-354 throughout layers 300, the cutouts of the different layers 300 will also be aligned relative to each other. For instance, as can be seen in FIG. 3, cutouts 342 and 343 are located in different ones of midsection layers 330, but are both centered about cell axis 350 when alignment elements 351-154 are aligned throughout layers 300. Once layers 300 are merged together, the different cutouts of midsection layers 330 that are centered about cell axis 350 define a single cell of cells 242 of cell lattice 240. There can be other examples, however, where cutouts of different ones of midsection layers 330 may be offset from each other, rather than aligned or centered about a cell axis.

In the present example, each of layers 300 of face plate 100 comprises the same type of material. As an example, midsection 230, inner skin 210, and outer skin 120, and respective midsection layers 330, inner skin layers 310, and outer skin layers 320, comprise a metallic material such as a metallic alloy. In the present example, individual ones of layers 300, such as layer 331, can comprise a thickness of approximately 0.01 inch or approximately 0.25 mm. In the same or other embodiments, one or more of such layers 300 can comprise a thickness ranging from between approximately 0.25 mm to approximately 2.54 mm.

In the present embodiment, the metallic material for layers 300 of face plate 100 can comprise a titanium alloy comprising at least approximately 8% aluminum (by volume). In the same or other examples, the metallic alloy can comprise a titanium alloy such as Ti-9S which contains 8% Al, 1% V, and 0.2% Si, with the remaining alloy composition being titanium and possibly some trace elements. In some embodiments, Ti-9S contains 6.5%-8.5% Al, between 1%-2% V, a maximum of 0.08% C, a maximum of 0.2% Si, a maximum of 0.3% Fe, a maximum of 0.2% O, a maximum of 0.05% N, trace amounts of Mo, and trace amounts of Sn, with the remaining alloy composition being titanium. In the same or other examples, the metallic alloy can comprise a titanium 8-1-1 alloy having approximately 8% aluminum, 1% vanadium and 1% chromium. Other materials may be used depending on their strength, considering their brittleness/elasticity as a beta-type crystal structure. For example, a titanium 6-4 alloy having approximately 6% aluminum and 4% vanadium, may be used in some embodiments, but can be from 5% to 12% less elastic than titanium 8-1-1 and may thus require further reinforcement or thickness for face plate 100 to properly withstand golf impact stresses. In contrast, other materials such as commercially pure titanium, may not be suitable to properly withstand the stresses to which face plate 100 is subjected.

There can be examples where the metallic alloy of layers 300 may comprise an alpha-type crystal structure prior to being merged together, and a stronger beta-type crystal structure after being merged together, such as via the high-heat and high pressure process described above. As an example, the alpha-type crystal structure may comprise a hexagonal crystal phase, and/or the beta-type crystal structure may comprise a body-centered cubic crystal phase. The transformation to beta-type crystal structure can permit the crystal structure of adjacent layers of layers 300 to be intermeshed together at a molecular level once the merging process is completed to yield the single integral piece of material for face plate 100.

As can be seen in FIGS. 3-4, the sheets of metallic material containing layers 300 are larger than face plate 100 in the present example. In the same or other examples, face plate 100 can be separated from the other portions of the sheets of metallic material once layers 300 have been merged into the single integral piece of material, by water-jetting or by otherwise cutting along a cut perimeter defining face plate edge 101 of face plate 100, such as the cut perimeter depicted in dotted lines in FIG. 4.

In the present example, face plate 100 comprises cell lattice 240 in a central area of midsection 230, as can be seen from the exemplary midsection layer 331 shown in FIG. 4. Midsection 230 also comprises perimeter midsection area 232 bounding cell lattice 240 and devoid of cells 242. Cell lattice 240 is thus separated from face plate edge 101 by perimeter midsection area 232. In some examples, separating cell lattice 240 from face plate edge 101 can permit cell lattice 240 to be distanced away from an interface or weld zone with club head body 109 when face plate 100 is coupled to a front end of golf club head 10. In the same or other examples, such distancing of cell lattice 240 from face plate edge 101 and the interface with club head body 109 can be beneficial for permitting a better weld or bond between face plate 100 and club head body 109. There can be other examples, however, where cell lattice 240 may extend within midsection 230 to face plate edge 101 or adjacent thereto.

Cell lattice 240 comprises a hexagonal isogrid pattern with six subcells per hexagon in the present example, as can be seen in FIG. 4, providing the strength-to-weight performance and versatility of a reinforced honeycomb structure. In the present embodiment, each of the six subcells comprise the same triangular shape. In the same or other examples, the depth of the walls of a cell or subcell (between inner skin 210 and outer skin 120) can be approximately 0.07 inches (approximately 1.78 mm), the length of the walls of the cell or subcell can be approximately 0.06 inches (approximately 1.53 mm), and/or the thickness of the walls of the cell or subcell can be approximately 0.01 inches (approximately 0.25 mm). In the same or other examples, the depth of the walls of a cell or subcell can be approximately 1.27 mm to approximately 3.05 mm, the length of the walls of the cell or subcell can be approximately 1 mm to approximately 3.05 mm, and/or the thickness of the walls of the cell or subcell can be approximately 0.20 mm to approximately 0.76 mm. Other examples of cell lattices, however, may comprise different shapes and/or dimensions.

Figure 6:
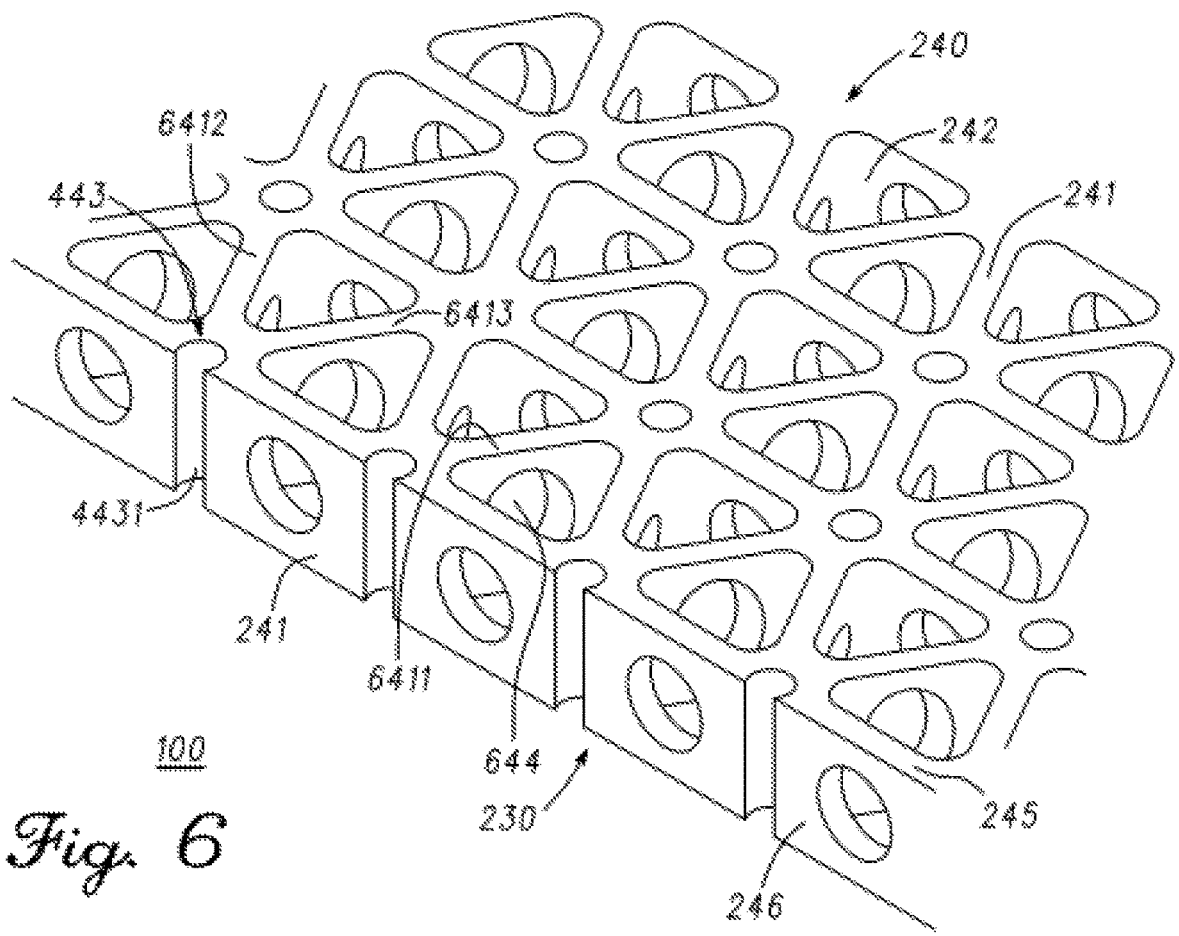
FIG. 6 illustrates a perspective view of a portion of the cell lattice of the face plate of FIG. 1.

Continuing with the figures, FIG. 6 illustrates a perspective view of a portion of cell lattice 240 of face plate 100, with inner skin 210, outer skin 120, and perimeter midsection area 232 removed for clarity. Cell lattice 240 comprises a plurality of cell junctions, such as cell junction 443, where two or more of walls 241 couple together. In the present example, the cell junctions provide an arcuate transition between the walls of a cell. For example, walls 6412 and 6413 meet at cell junction 443, and the interface between them at cell junction 443 is arcuate rather than pointed or sharp. In the present example, such arcuate interface comprises a radius of approximately 0.05 inch (approximately 0.13 mm), but there can be other examples where the arcuate interface can comprise a radius of approximately 0.025 mm to approximately 0.40 mm. Such arcuate features can be valuable, for example, to avoid sharp edges or corners that could concentrate stresses that could cause material fatigue and/or cracking within the cell lattice.

Also in the present example, one or more of the cell junctions can comprise respective junction channels, such as junction channel 4431 extending into cell junction 443 from inner midsection end 245 to outer midsection end 246. Junction channel 4431 comprises a largest dimension or diameter of approximately 0.015 inches (approximately 0.38 mm) in the present example, but there can be examples where similar junction channels can comprise a diameter and/or largest dimension of approximately 0.2 mm to approximately 0.66 mm.

In addition, cell lattice 240 also comprises one or more transverse passageways in the present example, such as transverse passageway 644 between at least two adjacent cells of cells 242. Transverse passageway 644 comprises a largest dimension or diameter of approximately 0.05 inches (approximately 1.27 mm) in the present example, but there can be examples where similar transverse passageways can comprise a diameter and/or largest dimension of approximately 0.5 mm to approximately 1.27 mm.

The addition of features such as junction channel 4431 and transverse passageway 644 can permit additional reduction in weight without compromising the strength or integrity of face plate 100. Also, the geometry and/or shape of junction channel 4431 and/or passageway 644 can be changed to be the same geometry and/or shape as cells 242 or another geometry and/or shape. Additionally, different ones of junction channel 4431 and/or passageway 644 can have different geometries and/or shapes.

Figure 7:
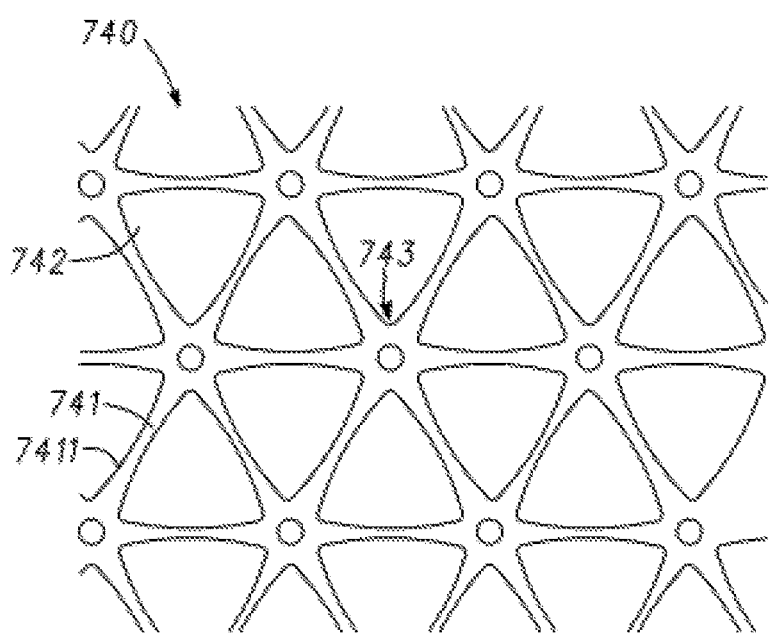
FIG. 7 illustrates a front view of a portion of a cell lattice of a face plate.

FIG. 7 illustrates a portion of cell lattice 740. In some examples, cell lattice 740 can be similar to cell lattice 240 (FIGS. 1-4, 6), and may be located between skins such as inner skin 210 and outer skin 120, as described above with respect to face plate 100 in FIGS. 1-3. Cell lattice 740 comprises walls 741 and cells 742, respectively similar to walls 241 and walls 242 (FIGS. 1-4, 6), but where walls 741 comprise varying wall dimensions. As an example, the wall thickness dimension of wall 7411 varies along its length, the wall thickness being thinner towards the center of its length and thicker towards the ends of its length. In the present example, such variation in wall thickness dimension also affects the dimensions of cells 742, where the walls of the isogrid triangular cells comprise arcuate legs, and where the hexagonal shape defined by cells bounding a cell junction, such as cell junction 743, is now arcuate and/or circular. In other examples, the wall thickness dimensions could vary otherwise, such as by being thicker towards the center of their respective lengths, and by being thinner towards the respective length ends thereof.

Figure 8:
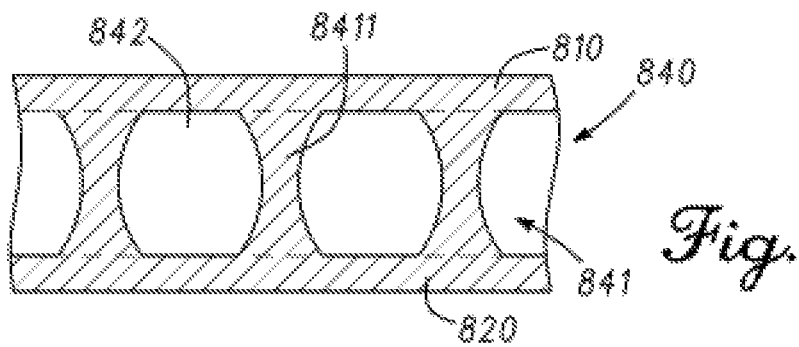
FIG. 8 illustrates a side view of a portion of a cell lattice of a face plate.

FIG. 8 illustrates a portion of cell lattice 840. In some examples, cell lattice 840 can be similar to cell lattice 240 (FIGS. 1-4, 6) and/or cell lattice 740 (FIG. 7). Cell lattice 840 is located between skins 810 and 820, which can be similar to inner skin 210 and/or outer skin 120, respectively, as described above with respect to face plate 100 (FIGS. 1-4, 6). Cell lattice 840 comprises walls 841 and cells 842, respectively similar to walls 241 and cells 242 (FIGS. 1-4, 6), and/or to walls 741 and cells 742 (FIG. 7). Walls 841 comprise varying wall dimensions in the present embodiment. As an example, the wall thickness dimension of wall 8411 varies along its height, the wall thickness being thinner towards the center of its height and thicker towards the ends of its height. In the present example, such variation in wall thickness dimension also affects the dimensions of cells 842, which can thus comprise a greater volume and arcuate dimensions. In other examples, the wall thickness dimensions could vary otherwise, such as by being thicker towards the center of their respective heights, and by being thinner towards the respective height ends thereof.

Skipping ahead in the figures, FIG. 27 illustrates a portion or cross section of cell lattice 1840 with varying wall dimensions. In some embodiments, cell lattice 1840 can be similar to cell lattice 240 (FIGS. 1-4, 6), cell lattice 740 (FIG. 7), and/or cell lattice 840 (FIG. 8). Cell lattice 1840 is located between skins 1810 and 1820, which can be similar to inner skin 210 and/or outer skin 120, respectively, as described above with respect to face plate 100 (FIGS. 1-4, 6). Cell lattice 1840 comprises walls 1841 and voids or cells 1842, respectively similar to walls 241 and cells 242 (FIGS. 1-4, 6), to walls 741 and cells 742 (FIG. 7), and/or to walls 841 and cells 842 (FIG. 8).

Referring to FIG. 27, in the illustrated embodiment, cell walls 1841 comprise a wall thickness 1851 that varies, similar to walls 841. In some embodiments, the wall thickness 1851 is greater near the inner skin 1810 and outer skin 1820 than near the central region of the lattice. For example, in the illustrated embodiment, the wall thickness dimension of wall 1841 varies along its height, the wall thickness being thinner towards the center of its height and thicker towards the ends of its height. Further, in the illustrated embodiment, the cell wall thickness 1851 varies defining an hourglass shape. The variation in wall thickness 1851 also affects the dimensions of cells 1842, which can thus comprise a greater volume and arcuate dimensions. In other embodiments, the wall thickness 1851 can vary otherwise, such as by being thicker towards the center of their respective heights, and by being thinner towards the respective height ends thereof. Further, in other embodiments, the cell walls 1841 can have any shape, such as circular, elliptical, square, rectangular, triangular, or any other polygon or shape with at least one curved surface.

In many embodiments, the smallest or minimum wall thickness 1851 can range from approximately 0.005 inches to approximately 0.2 inches. In some embodiments, the smallest or minimum wall thickness 1851 can be less than or equal to approximately 0.20 inches, less than or equal to approximately 0.15 inches, less than or equal to approximately 0.10 inches, less than or equal to approximately 0.05 inches, or less than or equal to approximately 0.02 inches. For example, in the illustrated embodiment, the smallest or minimum wall thickness 1851 is approximately 0.020 inches. In other embodiments, the smallest or minimum wall thickness 1851 can be approximately 0.025 inches, approximately 0.05 inches, approximately 0.10 inches, approximately 0.15 inches, or approximately 0.2 inches.

Further referring to FIG. 27, cells 1842 comprise a cell width 1852. The cell width 1852 varies with distance from the inner skin 1810 and/or outer skin 1820. In the illustrated embodiment, cell width 1852 is greatest near the center of cell 1851 and decreases near the inner skin 1810 and outer skin 1820. In other embodiments, the cell width 1852 can vary in any capacity. For example, in other embodiments, the cell width 1852 can be greatest near the inner skin 1810 and outer skin 1820, and can decrease near the center of cell 1851.

In many embodiments, the largest or maximum cell width 1852 can range from approximately 0.005 inches to approximately 0.2 inches. In some embodiments, the largest or maximum cell width 1852 can be less than or equal to approximately 0.20 inches, less than or equal to approximately 0.15 inches, less than or equal to approximately 0.10 inches, less than or equal to approximately 0.05 inches, or less than or equal to approximately 0.025 inches. For example, in the illustrated embodiment, the largest or maximum cell width 1852 is approximately 0.045 inches. In other embodiments, the largest or maximum cell width 1852 can be approximately 0.025 inches, approximately 0.05 inches, approximately 0.10 inches, approximately 0.15 inches, or approximately 0.2 inches.

In the illustrated embodiment, cells 1842 are coupled to one another, or are continuous throughout the cell lattice 1840. In other embodiments, cells 1842 can be discrete.

Further referring to FIG. 27, in the present embodiment, cell walls 1841 are substantially hourglass shaped. Further, in the present embodiment, cell walls 1841 overlap or contact or intersect adjacent cell walls 1841 at a single, first point near inner skin 1810 and at a single, second point near outer skin 1820. Cell walls 1841 comprise cell wall axes 1844 extending centrally within cell walls 1841 between inner skin 1810 and outer skin 1820. Cell walls 1841 are spaced apart from adjacent cell walls 1841 by a center-to-center distance 1854 measured as the distance between adjacent cell wall axes 1844.

In many embodiments, the center-to-center distance 1854 between adjacent axes 1844 can range from approximately 0.005 inches to approximately 0.2 inches. In some embodiments, the center-to-center distance 1854 between adjacent axes 1844 can be less than or equal to approximately 0.20 inches, less than or equal to approximately 0.15 inches, less than or equal to approximately 0.10 inches, less than or equal to approximately 0.05 inches, or less than or equal to approximately 0.025 inches. For example, in the illustrated embodiment, the center-to-center distance 1854 between adjacent axes 1844 is approximately 0.050 inches. In other embodiments, the center-to-center distance 1854 between adjacent axes 1844 can be approximately 0.025 inches, approximately 0.05 inches, approximately 0.10 inches, approximately 0.15 inches, or approximately 0.2 inches.

Further referring to FIG. 27, cell walls 1841 extend at an angle 1850 from cell wall axes 1844. In many embodiments, cell walls 1841 extend at an angle less than or equal to approximately 45 degrees from cell wall axes 1844. In these or other embodiments, the face plate 100 having cell lattice 1840 can be printed as described in method 50000 below without the use of support structures within cells 1842. In other embodiments, cell walls 1841 can extend at any angle greater than 0 and less than 180 degrees from cell wall axes 1844.

Figure 25:
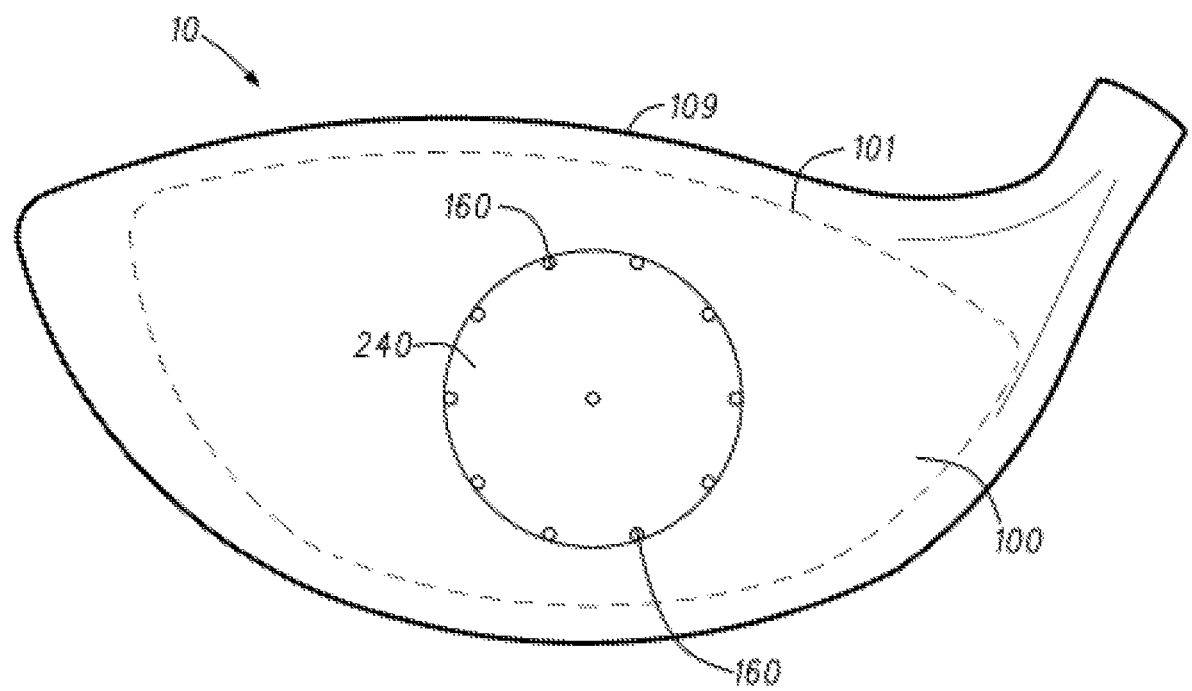
FIG. 25 illustrates a front view of a face plate of a golf club head having a cell lattice according to an embodiment.
Figure 26:
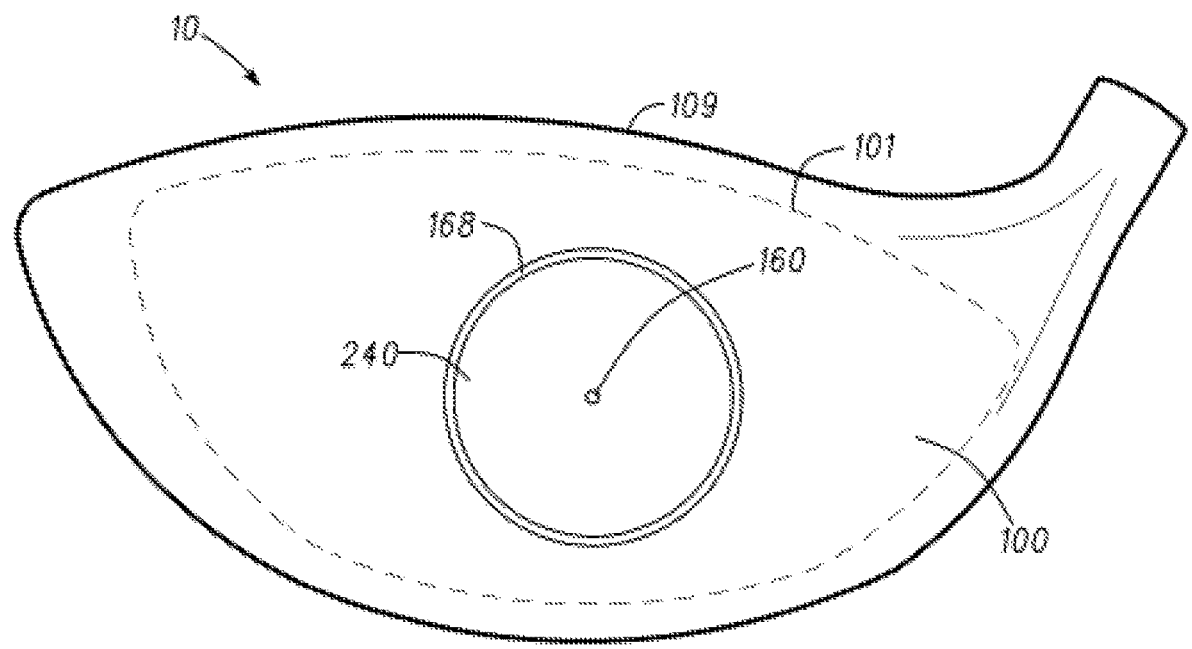
FIG. 26 illustrates a front view of a face plate of a golf club head having a cell lattice according to another embodiment.

Referring to FIGS. 25 and 26, in the illustrated embodiment, a portion of the face plate 100 is formed with the cell lattice 1840. In these or other embodiments, the portion of the face plate 100 formed with the call lattice 1840 can be subsequently coupled to the remainder of the face plate 100, as described in method 50000 below. In other embodiments, the entire face plate 100 can be formed as a single component with the cell lattice comprising at least a portion of the face plate 100. For example, in other embodiments, the entire face plate 100 can comprise the cell lattice 1840 and can be formed as a single component. For further example, in other embodiments, a portion (e.g. the center) of the face plate 100 can comprise the cell lattice 1840 and the face plate 100 can be formed as a single component.

In the illustrated embodiment, the portion of the face plate 100 having the cell lattice 1840 is substantially circular. In other embodiments, the portion of the face plate 100 having the cell lattice 1840 can comprise any other shape. For example, in other embodiments, the portion of the face plate 100 having the cell lattice 1840 can comprise an elliptical shape, as described in further detail in method 50000 below. For further example, in other embodiments, the portion of the face plate 100 having the cell lattice 1840 can comprise a square, a triangle, any other polygon, or any shape with at least one curved surface.

FIGS. 28A, 28B, and 28C illustrate a front, cross sectional view of a portion of a face plate 100 having cell lattice 1840 according to various embodiments. In the embodiment illustrated in FIG. 28A, cell wall axes 1844 are positioned radially from the center of the face plate 100. In other embodiments, cell wall axes 1844 can have other configurations. For example, cell wall axes 1844 can be configured in a diamond shaped pattern as illustrated in FIG. 28B, in a hexagonal shaped pattern as illustrated in FIG. 28C, or in any other configuration. Further, in the illustrated embodiments of FIGS. 28A-28C, cell wall axes 1844 comprise the same spacing. In other embodiments, cell wall axes 1844 can comprise different spacing.

In many embodiments, the cell lattice 1842 of face plate 100 reduces the weight of the face plate. In some embodiments, cell lattice 1842 of face plate 100 reduces the weight of the face plate without sacrificing durability. In some embodiments, cell lattice 1842 of face plate 100 reduces the weight of the face plate, and the thickness of the face plate is increased to maintain face plate durability. For example, in some embodiments, cell lattice 1842 can reduce the weight of the face plate up to approximately 3 grams. In many embodiments, reduced weight of face plate 100 due to cell lattice 1842 allows additional discretionary weight to be positioned elsewhere on the club head to achieve a desired head center of gravity or to increase club head moment of inertia to improve performance characteristics of the club head. For example, increased discretionary weight positioned on the perimeter of the club head can increase club head moment of inertia resulting in increased club head forgiveness. In many embodiments, weight shifted from the face plate to the perimeter of the club head can results in a greater increase in inertia than weight shifted from other portions of the club head (e.g. the crown). Further, in many embodiments, the cell lattice 1842 of face plate 100 increase face plate flexibility, resulting in increased bending of the face plate on impact with a golf ball, and therefore increased energy transfer to the golf ball and increased ball speed and travel distance.

Figure 11:
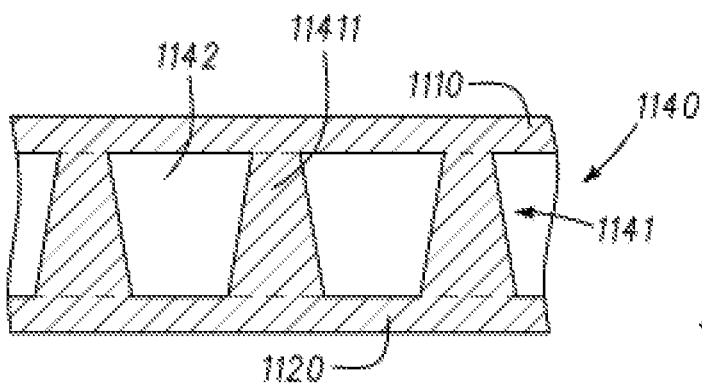
FIG. 11 illustrates a portion of a cell lattice of a face plate.

Backtracking through the figures, FIG. 11 illustrates a portion of cell lattice 1140 with varying wall dimensions. In some examples, cell lattice 1140 can be similar to cell lattice 240 (FIGS. 1-4, 6), cell lattice 740 (FIG. 7), and/or cell lattice 840 (FIG. 8). Cell lattice 1140 is located between skins 1110 and 1120, which can be similar to inner skin 210 and/or outer skin 120, respectively, as described above with respect to face plate 100 (FIGS. 1-4, 6). Cell lattice 1140 comprises walls 1141 and cells 1142, respectively similar to walls 241 and cells 242 (FIGS. 1-4, 6), to walls 741 and cells 742 (FIG. 7), and/or to walls 841 and cells 842 (FIG. 8). Walls 1141 also comprise varying wall dimensions in the present embodiment, tapering in thickness between skin 1110 and skin 1120. As an example, wall 11411 is thicker towards skin 1120, and decreases to a thinner thickness towards skin 1110. In the same or other examples, skin 1120 is configured to comprise the external surface of the faceplate, such that the thicker portion of walls 1141 face towards the impact surface of the faceplate. There may be other embodiments, however, where the thinner portion of walls 1141 can face towards the impact surface of the faceplate.

Figure 9:
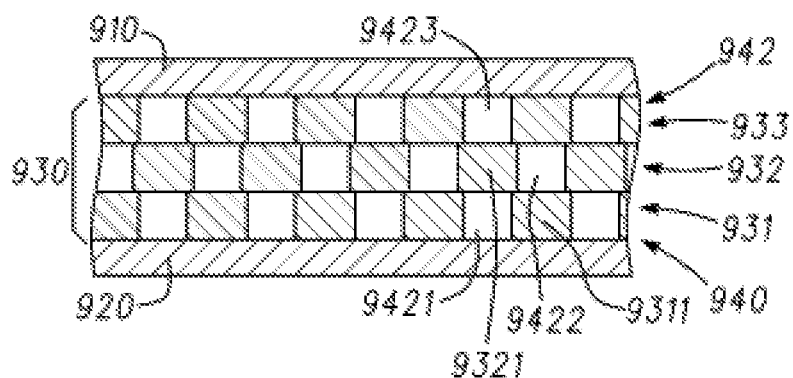
FIG. 9 illustrates a side view of a portion of a cell lattice of a face plate.

Backtracking through the figures, FIG. 9 illustrates a portion of cell lattice 940. In some examples, cell lattice 940 can be similar to cell lattice 240 (FIGS. 1-4, 6), cell lattice 740 (FIG. 7), cell lattice 840 (FIG. 8), and/or cell lattice 1140 (FIG. 11). Cell lattice 940 is located between skins 910 and 920, which can be similar to inner skin 210 and/or outer skin 120, as described above with respect to face plate 100 (FIGS. 1-4, 6). Cell lattice 940 comprises cells 942, which can be similar to cells 242 (FIGS. 1-4, 6), to cells 742 (FIG. 7), to cells 842 (FIG. 8), and/or to cells 1142 (FIG. 11). Cells 942 are offset from each other in the present example. For instance, cell 9421 is offset from cell 9422, which is offset from cell 9423. In addition, in the present example, midsection layers 931-933 define midsection 930 comprising cell lattice 940. Midsection layers 931-933 can be similar to, and may be merged together as described above, with respect to midsection layers 330 of face plate 100 (FIG. 3). Each of midsection layers 931-933 can comprise multiple layers before being merged together to form midsection 930. In the present example, cell 9422 is at least partially capped or defined by solid portions of midsection layers 931, 932, and 933 and cell 9421 is at least partially capped or defined by solid portions of midsection layers 931 and 932 and skin 920.

Figure 12:
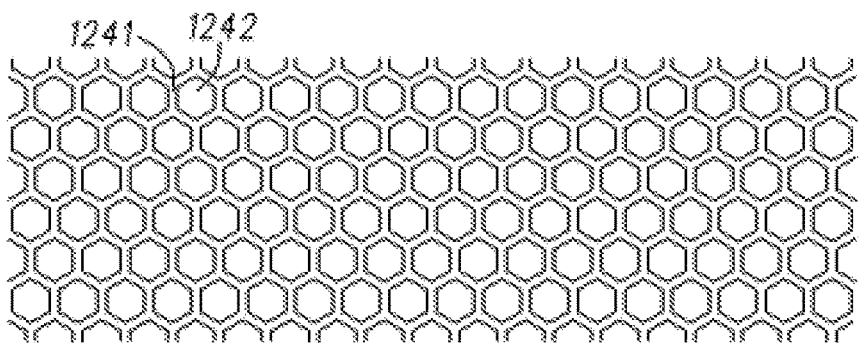
FIG. 12 illustrates a portion of a cell lattice of a face plate.
Figure 13:
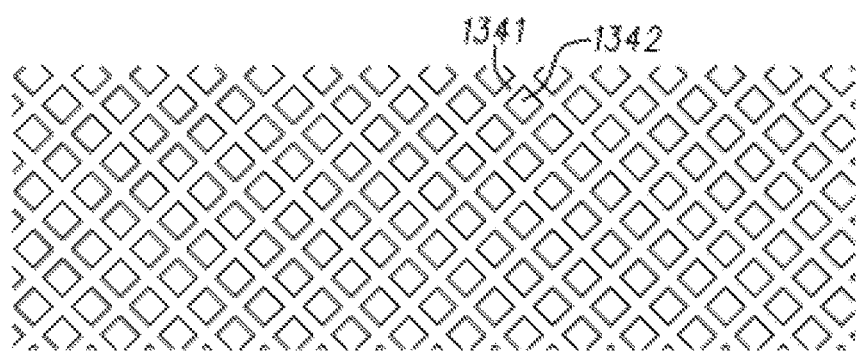
FIG. 13 illustrates a portion of a cell lattice of a face plate.
Figure 14:
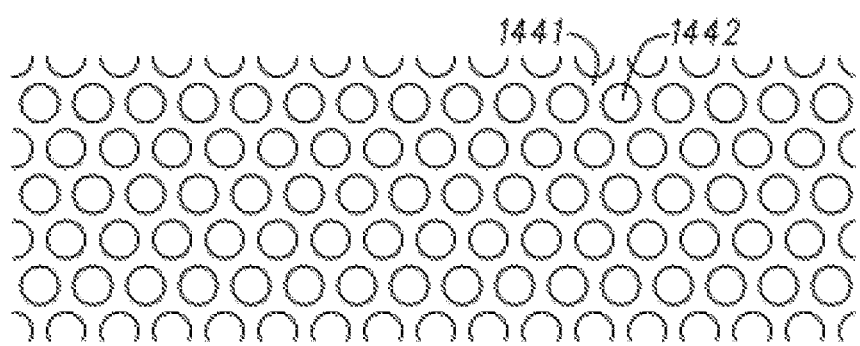
FIG. 14 illustrates a portion of a cell lattice of a face plate.
Figure 15:
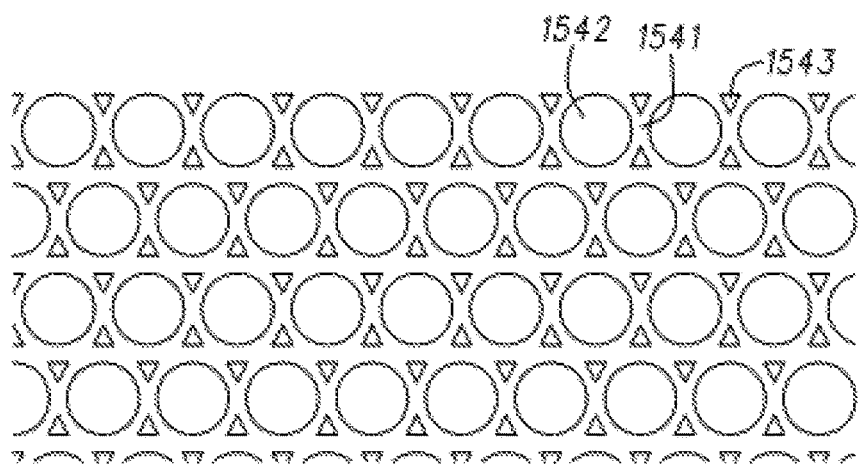
FIG. 15 illustrates a portion of a cell lattice of a face plate.

There can be other examples, however, that can comprise cell lattices with other types of geometrical shapes, dimensions, or combinations thereof. For instance skipping ahead to FIG. 12, cell lattice 1240 is presented with walls 1241 defining hexagonal cells 1242. FIG. 13 presents cell lattice 1340 with walls 1341 defining diamond or square cells 1342. FIG. 14 presents cell lattice 1440 with walls 1441 defining round or circular cells 1442. Other shapes can also be implemented in the same or other cell lattice examples, such as pentagonal cells, octagonal cells, triangular cells, and/or combinations thereof, among others. For instance, FIG. 15 presents cell lattice 1540 with walls 1541 defining circular cells 1542 interspersed with triangular cells 1543.

Figure 16:
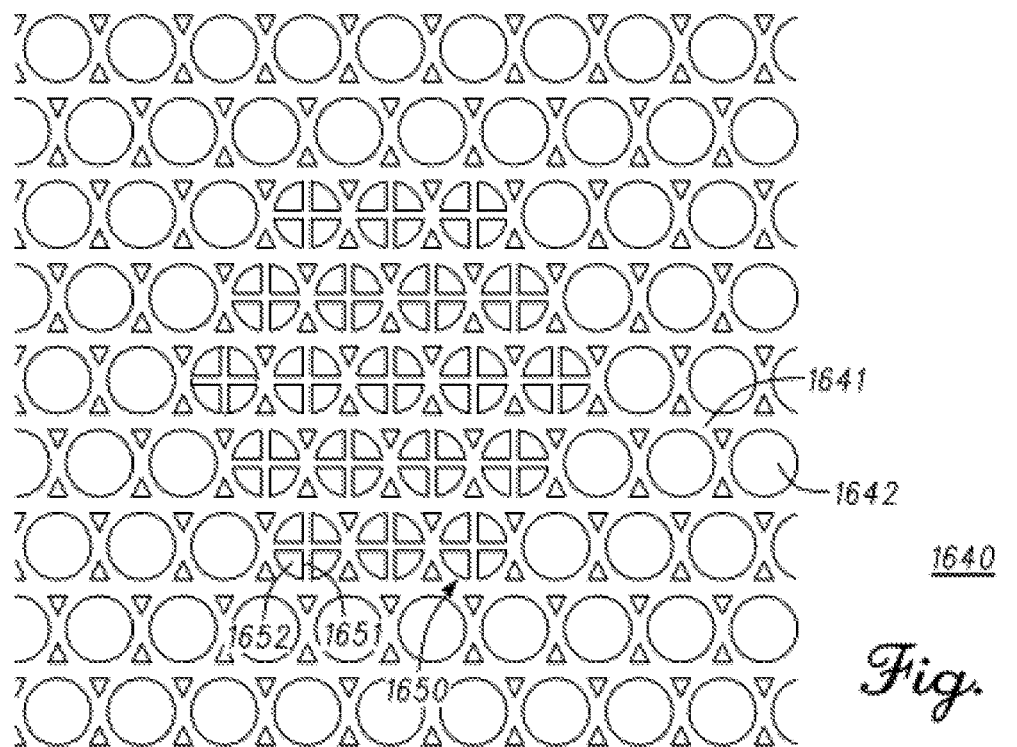
FIG. 16 illustrates a portion of a cell lattice of a face plate.

There also can be examples where individual cells of a cell lattice can comprise subcells therewithin. For example, cells 242 (FIGS. 1-4, 6) can be considered in some examples as defining subcells of larger hexagonal cells of cell lattice 240. As another example, FIG. 16 presents cell lattice 1640 with walls 1641 defining cells 1642, where cell subset 1650 of cells 1642 comprise subcells 1652 defined by subwalls 1651 within individual cells of cell subset 1650. Cell subsets such as cell subset 1650 may be located at specific locations to reinforce against stresses expected thereat. In some examples, such cell subsets may be located at or by a target strike region of a faceplate, such as target strike region 150 of face plate 100 (FIG. 1). Other combinations of cells, subcells, shapes, and/or dimensions for a cell lattice may be formed by combining different cells, subcells, shapes, and/or dimensions disclosed herein or similar thereto.

Although cell lattices 1240 (FIG. 12), 1340 (FIG. 13), 1440 (FIG. 14), 1540 (FIG. 15), 1640 (FIG. 16), can differ in some aspects, they can be otherwise similar to one or more of cell lattices 240 (FIGS. 1-4, 6), cell lattice 740 (FIG. 7), cell lattice 840 (FIG. 8), and/or cell lattice 1140 (FIG. 11).

Figure 17:
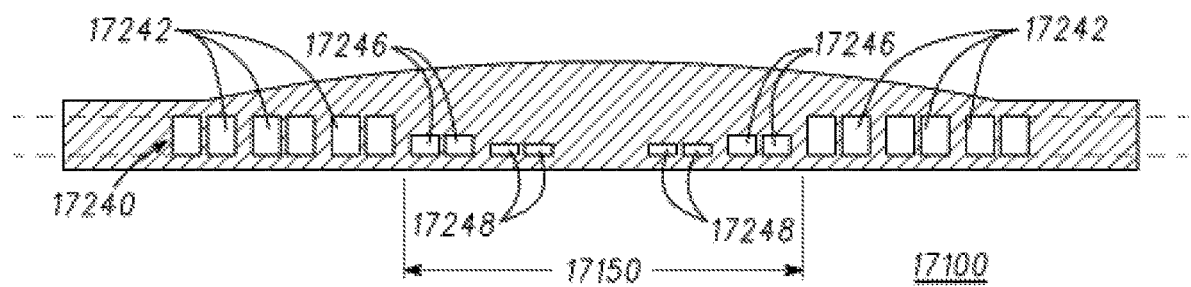
FIG. 17 illustrates a cross-sectional view of a face plate having a cell lattice with cells that vary in height amongst each other.

In some examples, the height of the cells of a cell lattice may vary from cell to cell. As an example, FIG. 17 presents a cross-sectional view of face plate 17100 with cell lattice 17240 similar to cell lattice 240 (FIGS. 1-4, 6). Cell lattice 17240, however, comprises cells that vary in height amongst each other. In the present example, the height of cells 17242 is greater than the height of cells 17246, and the height of cells 17246 is greater than the height of cells 17248. The cells of cell lattice 17240 are positioned in the present example such as to decrease in height towards a center of target strike region 17150, where greater stresses can be expected. In addition, the centermost portion of target strike region 17150 is devoid of any cell of cell lattice 17240 in the present example for further reinforcement. Other examples, however, may comprise cell lattices with cells whose heights vary in a different pattern.

Figure 18:
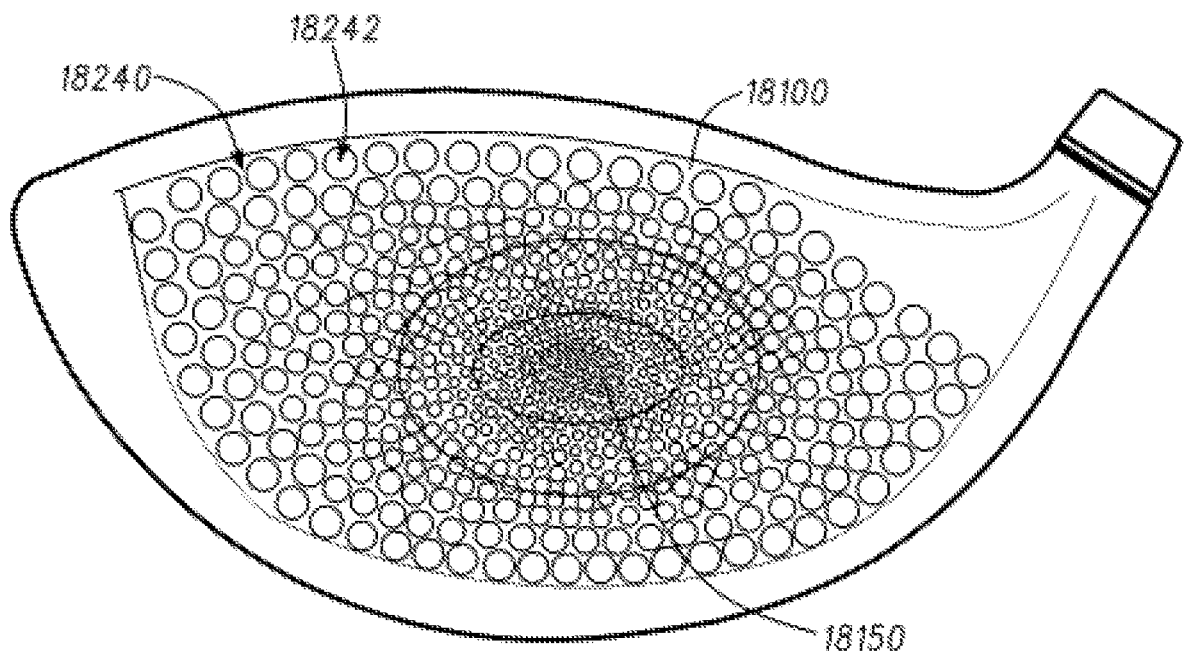
FIG. 18 presents a front "x-ray" perspective view of a faceplate comprising a cell lattice variable cell dimensions.

FIG. 18 presents a front "x-ray" perspective view of a faceplate 18100 of a golf club head.

Faceplate 18100 comprises cell lattice 18240 with variable cell dimensions. In the present example, cell lattice 18240 comprises a grid of cells 18242 that decrease in size towards a center of target strike region 18150. In the same or other examples, the walls between cells 18242 of cell lattice 18240 can increase in thickness towards the center of target strike region 18150. In other examples, the size of cells 18242, and/or the thickness of the walls therebetween, can increase or decrease in size towards another region of faceplate 18100, such as towards the crown region, the sole region, the heel region, and/or the toe region.

In the same or other examples, the size of cells 18242 can decrease or increase as a function of distance from the center of target strike region 18150. In other examples, however, the size and/or concentration of cells 18242 can change relative to another feature of the faceplate, such as by increasing or decreasing from top edge to bottom edge or the face plate, and/or such as by increasing or decreasing from heel end to toe end of the face plate. In some embodiments, cells 18242 can decrease in size or dimension between approximately 1% to approximately 10% from cell to cell as the distance to the center of target strike region 18150 shortens. In the same or other embodiments, a distance between cells 18242 can increase between approximately 1% to approximately 10% from cell to cell as the distance to the center of target strike region 18150 shortens. There can also be example where the change in size or concentration of cells 18242, relative to the center of target strike region 18150, can change in a non-linear and/or a step function fashion.

Although cells 18242 of cell lattice 18240 are illustrated in FIG. 18 as circular cells, cells 18242 can be representative of other shapes, sizes, or dimensions that can be used to implement the varying cell size features described above. For instance, the cells of cell lattice 18240 could instead comprise other geometrical shapes such as triangles, hexagons, diamonds, octagons, pentagons, isogrids, and/or some combination thereof in some implementations while still varying in size or concentration across at least a portion of face plate 18100.

Figure 19:
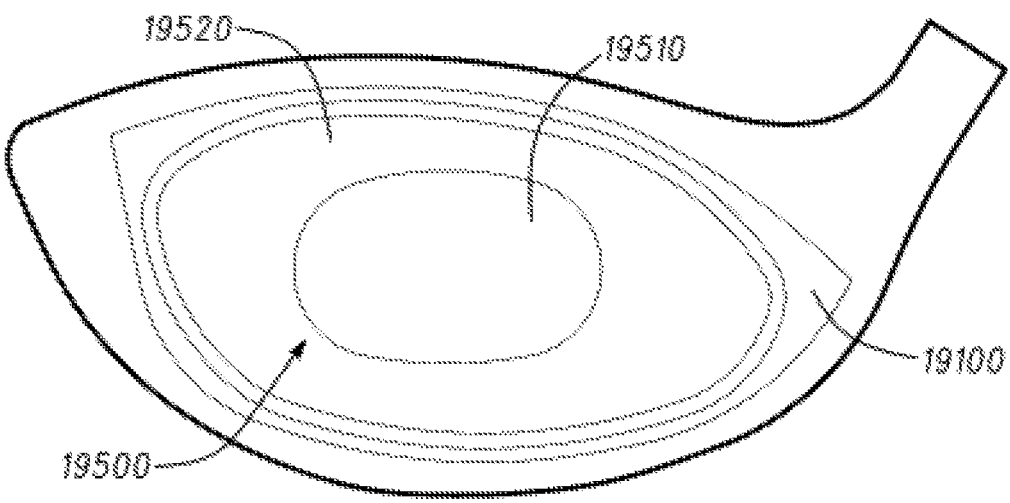
FIG. 19 illustrates a front view of a faceplate subdivided into different cell lattice regions with one or more cell lattices therewithin.

FIG. 19 illustrates a front view of faceplate 19100 of a golf club head, where faceplate 19100 is subdivided into different cell lattice regions 19500 with one or more cell lattices therewithin. In the present example, cell lattice regions 19500 comprise center lattice region 19510 and periphery lattice region 19520, where center lattice region 19510 is located at a center region of face plate 19100, bounded by periphery lattice region 19520 around its perimeter. Center lattice region 19510 can be stiffer than periphery lattice region 19520, which is more elastic in the present example, where the elasticity of cell lattice regions 19500 can be fine tuned by implementing appropriate cell patterns, features, and/or dimensions to achieve a desired elastic modulus range. In some examples, having center lattice region 19510 stiffer relative to periphery lattice region 19520 can allow more forgiveness for golf shots not hit at the target strike region of the face plate. In the same or other examples, a characteristic time (CT) of a golf club can also be adjusted or controlled by adjusting the flexibility or elasticity of different portions of the face plate such as cell lattice regions 19500. There can be other examples, however, where the center lattice region 19510 need not be stiffer than periphery lattice region 19520, and/or where center lattice region 19510 and periphery lattice region 19520 can comprise a substantially similar stiffness or modulus of elasticity.

In some examples, center lattice region 19510 may be similar to or correspond to target strike region 150 of face plate 100 (FIG. 1), or to other target strike regions of other face plates described herein. In the present example, cell lattice regions 19500 can comprise or be similar to one or more of the cell lattices described herein, but can differ from each other with respect to at least one feature. As an example, center lattice region 19510 can comprise a cell lattice similar to isogrid cell lattice 240 (FIGS. 1-4, 6), while periphery lattice region 19520 can comprise a cell lattice similar to hexagonal cell lattice 1240 (FIG. 12). As another example, center lattice region 19510 can comprise a cell lattice similar to circular cell lattice 1440 (FIG. 14), while periphery lattice region 19520 can comprise a cell lattice similar to multi-shaped cell lattice 1540 (FIG. 15). As yet another example, some cells of cell lattice regions 19500 can comprise subcells and/or subwalls. For instance, cells of center lattice region 19510 can comprise subcells and subwalls similar to cell subset 1650 (FIG. 16), while cells of periphery lattice region 19520 need not comprise subcells or subwalls. In the same or other examples, cell lattice regions 19500 can comprise cells of different heights. For instance, center lattice region 19510 can comprise cells of a reduced height, such as the cells of target strike region 17150 in FIG. 17, while periphery lattice region 19520 can comprise cells of greater height than those of periphery lattice region 19520. In the same or other examples, center lattice region 19510 may be partially or totally devoid of cells, while surrounded by the cells of periphery lattice region 19520.

Figure 20:
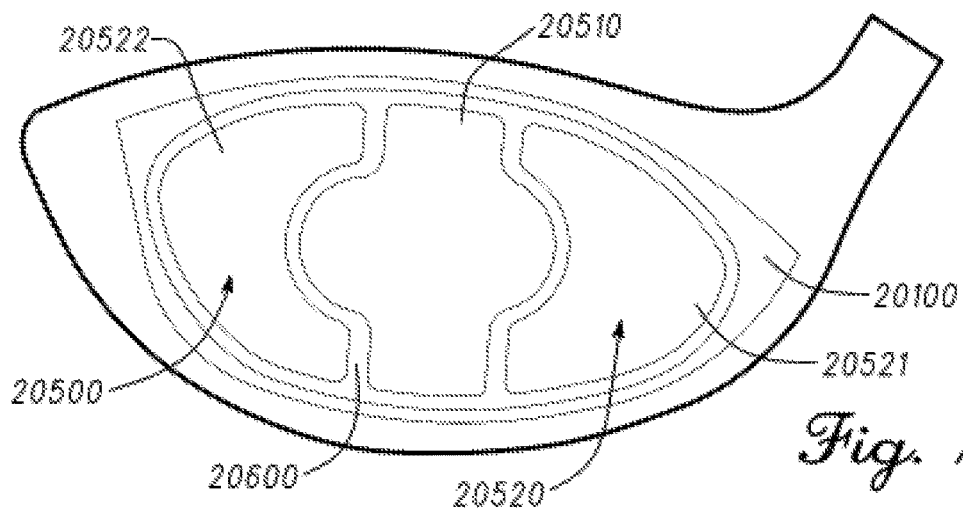
FIG. 20 illustrates a front view of a faceplate subdivided into different cell lattice regions with one or more cell lattices therewithin.

FIG. 20 illustrates a front view of faceplate 20100 of a golf club head, where faceplate 20100 is subdivided into different cell lattice regions 20500 with one or more cell lattices therewithin. In the present example, cell lattice regions 20500 comprise center lattice region 20510 and periphery lattice regions 20520, where periphery lattice regions 20520 comprise heel lattice region 20521 and toe lattice region 20522. Center lattice region 20510 is located at a center region of face plate 20100, bounded at least partially by periphery lattice regions 20520. Cell lattice regions 20500 can comprise or be similar to one or more of the cell lattices described herein, but can differ from each other with respect to at least one feature, such as in terms of stiffness, elasticity, and/or type of cell lattice comprised. As an example, center lattice region 20510 extends towards the top and bottom ends of faceplate 20100, and can be otherwise similar to center lattice region 19510 (FIG. 19), while periphery lattice regions 20520 can be similar to periphery lattice region 19520 (FIG. 19). In the present examples, the cell lattices of periphery lattice regions 20520 can be similar to each other, but there can be other examples where such cell lattices may differ from each other.

In the present example, center lattice region 20510 can be stiffer than heel lattice region 20521 and toe lattice region 20522, while the stiffnesses of heel lattice region 20521 and of toe lattice region 20522 can be similar to each other. There can also be examples, however, where the stiffnesses of heel lattice region 20521 can be greater than the stiffness of toe lattice region 20522, or vice-versa. The ability to establish such different stiffness options for the different regions of faceplate 20100 can permit, for example, an optimization of ball speed due to differences in club head speed across the faceplate as induced by club head rotation about the golf shaft axis during swinging, the offsetting of a bias in average impact location, and/or the fine-tuning of the shape or position of the club head's target strike region. In addition, cell lattice regions 20500 are separated from each other by one or more boundary channels 20600 in the present example. Boundary channels 20600 are devoid of a cell lattice therewithin, but there also can be examples where boundary channels 20600 can comprise a cell lattice similar to one or more of the cell lattices described herein. In other examples, however, faceplate 20100 can be devoid of boundary channels 20600, such that cell lattice regions 20500 contact or merge into each other.

Figure 21:
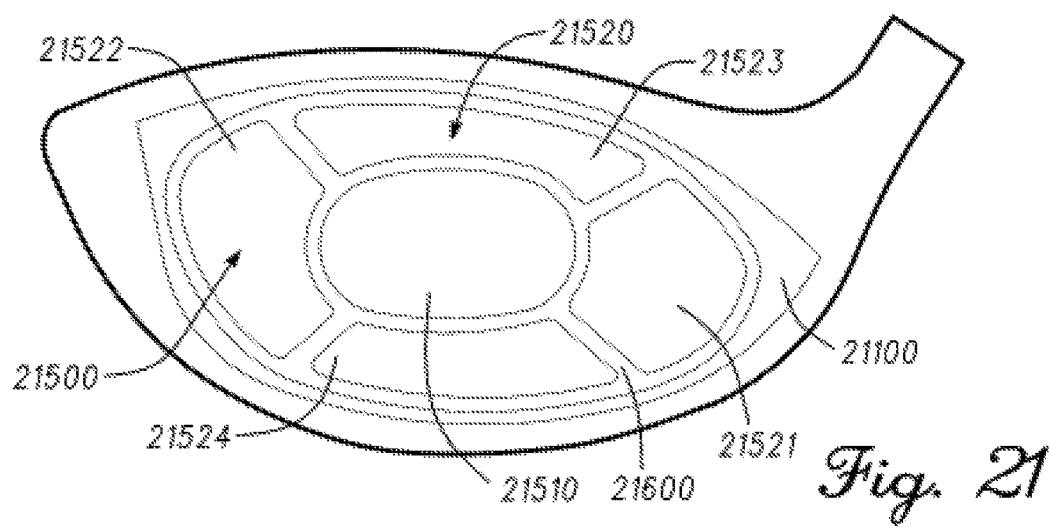
FIG. 21 illustrates a front view of a faceplate subdivided into different cell lattice regions with one or more cell lattices therewithin.

FIG. 21 illustrates a front view of faceplate 21100 of a golf club head, where faceplate 21100 is subdivided into different cell lattice regions 21500 with one or more cell lattices therewithin. In the present example, cell lattice regions 21500 comprise center lattice region 21510 and periphery lattice regions 21520, where periphery lattice regions 21520 comprise heel lattice region 21521, toe lattice region 21522, top lattice region 21523, and bottom lattice region 21524. Center lattice region 21510 is located at a center region of face plate 21100, bounded at least partially by periphery lattice regions 21520. Cell lattice regions 21500 can comprise or be similar to one or more of the cell lattices described herein, but can differ from each other with respect to at least one feature, such as in terms of stiffness, elasticity, and/or type of cell lattice comprised. As an example, center lattice region 20510 can be similar to center lattice region 19510 (FIG. 19) and/or to center lattice region 20510 (FIG. 20). Periphery lattice regions 21520 can be similar to periphery lattice region 19520 (FIG. 19) and/or to periphery lattice regions 20520 (FIG. 20). In the present example, the cell lattices comprised by periphery lattice regions 21520 differ from each other. For example, the cell lattices of top lattice region 21523 and bottom lattice region 21524 differ from the cell lattices of heel lattice region 21521 and toe lattice region 21522. In the same or other examples, the cell lattice of top lattice region 21523 can be similar to the cell lattice of bottom lattice region 21524, while the cell lattice of toe lattice region 21522 can be similar to the cell lattice of heel lattice region 21521. In other examples, however, the cell lattices of each of top lattice region 21523, bottom lattice region 21524, toe lattice region 21522, and heel lattice region 21521 can all be similar to each other.

In the present example, center lattice region 21510 can be stiffer than periphery lattice regions 21520. The stiffnesses of periphery lattice regions 21520 can be similar to each other or differ from each other, depending on the embodiment. For example, the stiffness of top lattice region 21523 and of bottom lattice region 21524 may be stiffer than the stiffnesses of heel lattice region 21521 and of toe lattice region 21522, or vice-versa. There can also be examples where each of periphery lattice regions 21520 can comprise a different stiffness. The ability to establish such different stiffness options for the different regions of faceplate 21100 can permit further alternatives regarding benefits similar to those described above with respect to faceplate 20100. In the present example, cell lattice regions 21500 are separated from each other by one or more boundary channels 21600, which can be similar to boundary channels 20600 (FIG. 20).

Figure 22:
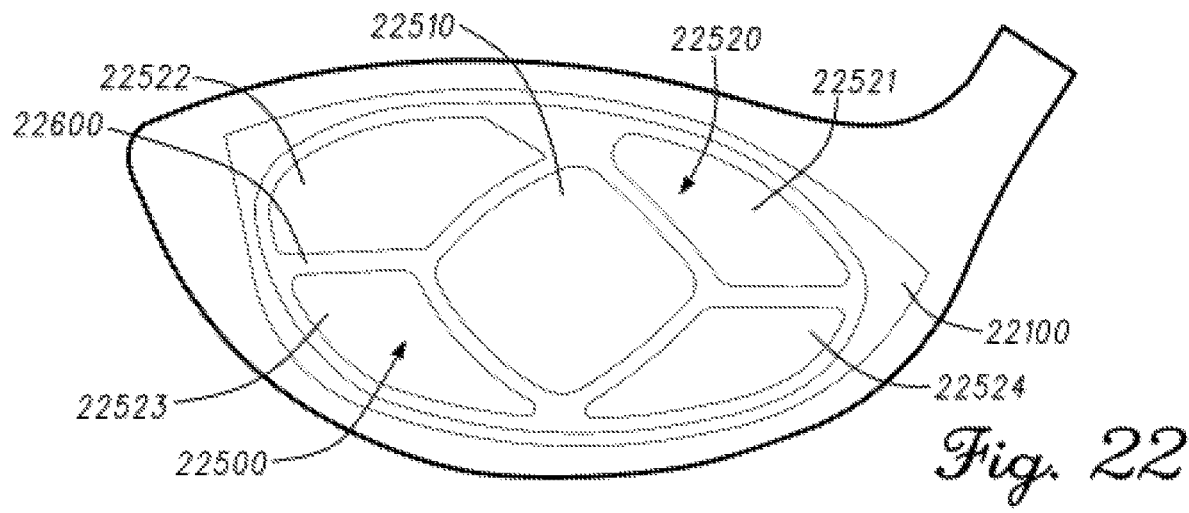
FIG. 22 illustrates a front view of a faceplate subdivided into different cell lattice regions with one or more cell lattices therewithin.

FIG. 22 illustrates a front view of faceplate 22100 of a golf club head, where faceplate 22100 is subdivided into different cell lattice regions 22500 with one or more cell lattices therewithin. In the present example, cell lattice regions 22500 comprise center lattice region 22510 and periphery lattice regions 22520, where periphery lattice regions 22520 comprise top-heel lattice region 22521, top-toe lattice region 22522, bottom-toe lattice region 22523, and bottom-heel lattice region 22524. Center lattice region 22510 is located at a center region of face plate 21100, bounded at least partially by periphery lattice regions 22520. Cell lattice regions 22500 can comprise or be similar to one or more of the cell lattices described herein, but can differ from each other with respect to at least one feature, such as in terms of stiffness, elasticity, and/or type of cell lattice comprised. In some examples, center lattice region 22510 can be similar to center lattice region 21510 (FIG. 21), while periphery lattice regions 22520 can be similar to periphery lattice regions 21520, but shifted in terms of location across faceplate 22100. In one example, the stiffnesses and/or cell lattices of top-heel lattice region 22521 and of top-toe lattice region 22522 may differ from the stiffnesses and/or cell lattices of bottom-heel lattice region 22524 and of bottom-toe lattice region 22523. In another example, the stiffnesses and/or cell lattices of top-toe lattice region 22522 and of bottom-toe lattice region 22523 may differ from the stiffnesses and/or cell lattices of top-heel lattice region 22521 and of bottom-heel lattice region 22524. There can also be embodiments where the stiffnesses and/or cell lattices of each of periphery lattice regions 22520 differ from each other. The ability to establish such different stiffness options for the different regions of faceplate 22100 can permit further alternatives regarding benefits similar to those described above with respect to faceplate 20100 and/or 21100. In the present example, cell lattice regions 22500 are separated from each other by one or more boundary channels 22600, which can be similar to boundary channels 20600 (FIG. 20).

Figure 10:
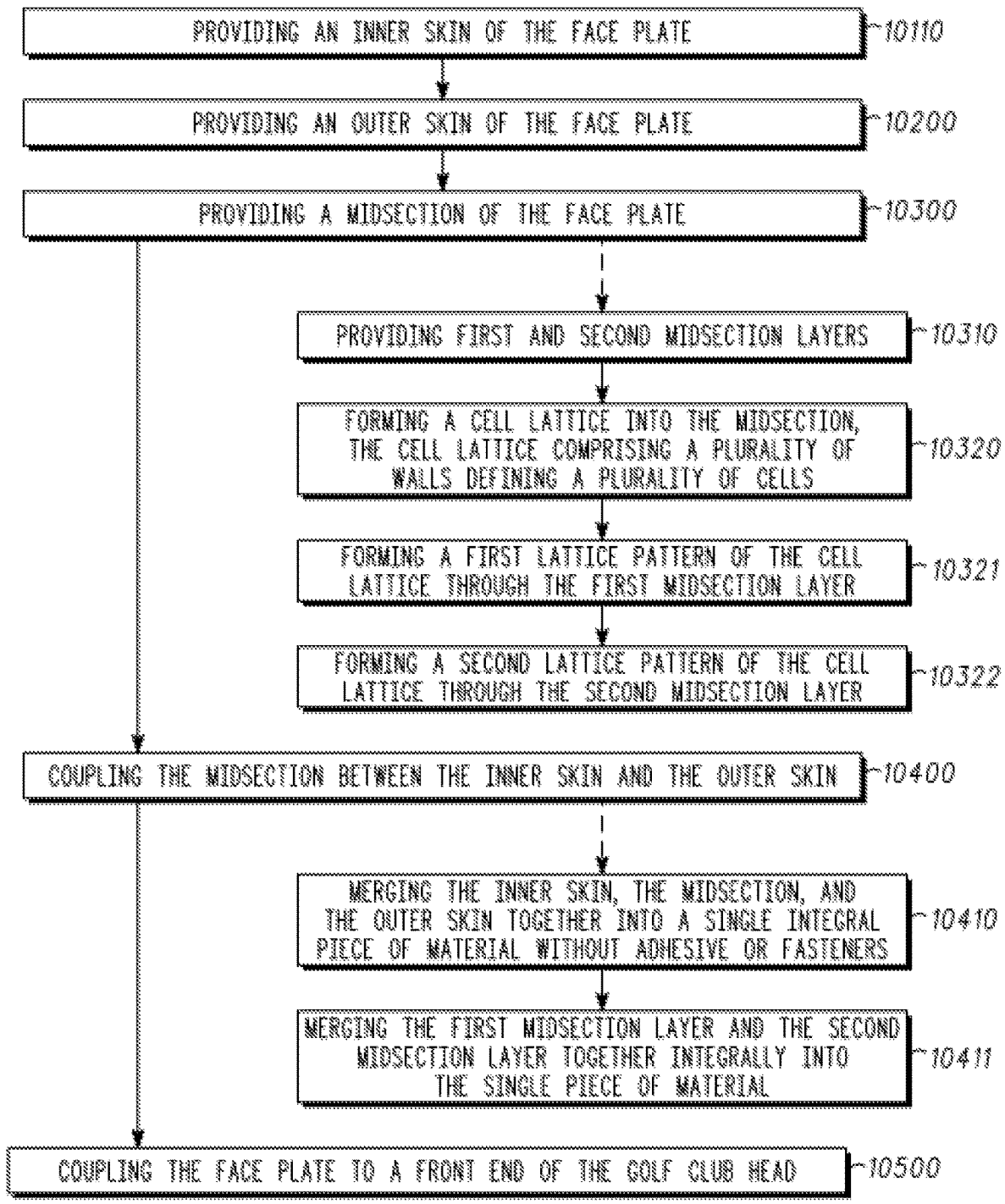
FIG. 10 illustrates a flowchart for a method for providing a face plate for a golf club head.

Backtracking through the figures, FIG. 10 illustrates a flowchart for a method 10000 for providing a face plate for a golf club head. In some embodiments, the face plate can be similar to face plate 100 (FIGS. 1-4, 6), and or to a face plate comprising one or more cell lattices such as those described with respect to FIGS. 7-9, 11, and/or 12-11).

Block 10100 of method 10000 comprises providing an inner skin of the face plate. Block 10200 of method 10000 comprises providing an outer skin of the face plate. In some examples, the inner skin of block 10100 can be similar to inner skin 210, while the outer skin of block 10200 can be similar to outer skin 120 (FIGS. 2-3). In the same or other examples, block 10100 may comprise providing first and second inner skin layers of the inner skin, where such first and second inner skin layers may be similar to inner skin layers 310 (FIG. 3). In the same or other examples, block 10200 may comprise providing first and second outer skin layers of the outer skin, where such first and second outer skin layers may be similar to outer skin layers 320 (FIG. 3).

Block 10300 of method 10000 comprises providing a midsection of the face plate. In some examples, the midsection can be similar to midsection 230 (FIGS. 1-4, 6) and/or midsection 930 (FIG. 9). In the same or other examples, block 10300 can comprise sub-block 10310 for providing first and second midsection layers of the midsection of block 10300. There can be examples where the first and second midsection layers can be similar to midsection layers 330 (FIG. 3). In the present example, the inner skin of block 10100, the outer skin of block 10200, and the midsection of block 10300 are provided as separate distinct portions, although there can be other embodiments where two of them may be provided already combined together.

In some examples, block 10300 can also comprise sub-block 10320 for forming a cell lattice in the midsection, the cell lattice comprising a plurality of walls defining a plurality of cells. In some examples, the cell lattice can be similar to cell lattice 240 of midsection 230 (FIGS. 2-6), to one or more of cell lattices 740 (FIG. 7), 840 (FIG. 8), 940 (FIG. 9), 1140 (FIG. 11), 1240 (FIG. 12), 1340 (FIG. 13), 1440 (FIG. 14), 1540 (FIG. 15), 1640 (FIG. 16), 17240 (FIG. 17), and/or 18240 (FIG. 18), to one or more of the cell lattices comprised by the cell lattice regions of faceplate 19100 (FIG. 19), 20100 (FIG. 20), 21100 (FIG. 21), and/or 22100 (FIG. 22), and/or to other cell lattice variations similar to those described herein.

Sub-block 10320 may comprise sub-block 10321 for forming a first lattice pattern of the cell lattice through the first midsection layer, and/or sub-block 10322 for forming a second lattice pattern of the cell lattice through the second midsection layer. In some examples, the first lattice pattern of sub-block 10321 can be similar to cell lattice pattern 341 through midsection layer 331 (FIGS. 3-4). In the same or other examples, the second lattice pattern of sub-block 10322 can be similar to another lattice pattern of another midsection layer, such as lattice pattern 242 of midsection layer 332 (FIG. 3). There can also be examples where the first and second lattice patterns of sub-blocks 10321-10322 can correspond to lattice patterns for the cell lattices of FIG. 7-9 or 11-22, and/or to other cell lattice variations similar to those described herein.

Sub-block 10321 may comprise forming a first cutout through the first midsection layer, where the first cutout is configured to define a first volume portion of a first cell of the cell lattice. Similarly, sub-block 10322 may comprise forming a second cutout through the second midsection layer, where the second cutout is configured to define a second volume portion of the first cell of the cell lattice. As an example, the first cutout may be similar to cutout 342 through midsection layer 331 (FIG. 3), and the second cutout can be similar to cutout 343 through midsection layer 332 (FIG. 3) so that, when midsection layers 330 are coupled together, such as through sub-block 10411 (below), the volumes defined by cutouts 342 and 343 will combine to define at least part of the volume of a cell of cell lattice 240. There can be examples where sub-block 10322 can comprise forming the second cutout to comprise a different dimension than the first cutout, such as a different radius, a different perimeter length, a different area, or a different volume. Accordingly, the first and second cutouts need not be equal to each other, thereby adding flexibility to further define desired features for the volume and/or shape of the cells of the cell lattice.

In some examples, forming the cell lattice in block 10320 can comprise aligning the second midsection layer over the first midsection layer such that the first and second cutouts are centered about a first cell axis of a cell of cell lattice 240. As an example, as described above with respect to FIGS. 3-4, midsection layers 300 comprise respective alignment elements 351-354, and can be aligned with each other by aligning respective alignment members 351-354 throughout the stack of midsection layers 300. Accordingly, cutout 342 of layer 331 and cutout 343 of layer 332 end up aligned relative to each other by being centered about cell axis 350, where cell axis 350 traverses through stacked cutouts of layers 330 to define a cell of cell lattice 240 in midsection 230. In some examples, the alignment elements can comprise features such as holes and/or indentions that can match each other for alignment by corresponding shape and/or by location. With respect to the example of FIGS. 3-4, alignment elements 351-354 are offset relative to each other to permit alignment of adjacent ones of layers 300 only in a single orientation.

There can also be examples where not all cutouts of stacked layers of the midsection need be aligned with each other centered about a cell axis. In some embodiments, the cutouts and/or cells of the cell lattice may be offset from each other. For instance, forming the first lattice pattern in block 10321 can comprise forming the first cutout through the first midsection layer to define a first volume portion of the first cell, and forming the second lattice pattern block 10322 can comprise forming the second cutout through the second midsection layer to define a second volume portion of a second cell of the cell lattice. In the same or other examples, the second cell can be at least partially capped or defined by solid portions of the first midsection layer and/or the outer skin, and/or the first cell can be at least partially capped or defined by solid portions of the second midsection layer and/or the inner skin. For instance, as shown in FIG. 9, midsection layers 931-933 can be aligned and stacked relative to each other such that cells 9421, 9422, and 9423 are offset from each other, such that cell 9421 is at least partially capped or defined by solid portion 9321 of layer 932, and cell 9422 is at least partially capped or defined by solid portion 9311 of layer 931. Although midsection 930 is shown in FIG. 9 as layers 931-933 for simplicity, layers 931-933 may each represent a plurality of midsection layers stacked together in the same or other embodiments.

Block 10400 of method 10000 comprises coupling the midsection of block 10300 between the inner skin of block 10100 and the outer skin of block 10200. In some examples, the midsection may comprise an inner midsection end coupled to the inner skin of block 10100, and an outer midsection end coupled to the outer skin of block 10200, such that the midsection is "sandwiched" therebetween. In the same or other examples, block 10400 can comprise sub-block 10410 for merging the inner skin, the midsection, and the outer skin together into a single integral piece of material without adhesives or fasteners. For instance, the inner skin, the midsection, and the outer skin may be merged together via a high-heat and high-pressure process as described above with respect to FIGS. 2-3, such as via a diffusion bonding process. There can be embodiments where sub-block 10410 can be carried out such that the single integral piece of material is seamless between the inner skin and the midsection, and between the midsection and the outer skin. In the same or other examples, sub-block 10410 can comprise sub-block 10411 for merging the first midsection layer and the second midsection layer together integrally into the single piece of material. As an example, sub-block 10411 can comprise merging midsection layers 330 together (FIG. 3) as described above. In the same or other examples, sub-block 10410 can also comprise merging inner skin layers 310 (FIG. 3) together, and/or merging outer skin layers 320 (FIG. 3) together into the single piece of material for the faceplate.

Such seamless and single-piece merging between the inner skin, the mid section and the outer skin, and/or between their respective layers, can occur when the merging occurs at the molecular level. For example, the inner skin, the midsection, and the outer skin can all be provided to comprise the same metallic material, where such material can be selected to be suitable for merging the different portions of the faceplate at the molecular level when exposed to a high heat and high-pressure process, such as through a diffusion bonding process. In some examples, the metallic material can comprise a metallic alloy, as described above, and the merging at the molecular level can take advantage of the crystal structure of the metallic material to achieve integral bonding to generate the single piece of material for the faceplate. As an example, the inner skin may be provided in block 10100 to comprise a first crystal structure of an alpha-type structure; the outer skin may be provided in block 10200 to comprise a second crystal structure of the alpha-type structure; and the midsection may be provided in block 10300 to comprise a midsection crystal structure of the alpha-type structure. Then, at block 10400, the first crystal structure of the inner skin, the second crystal structure of the outer skin, and the midsection crystal structure of the midsection can be transformed into a beta-type structure such that the midsection crystal structure is intermeshed with the first crystal structure, and the midsection crystal structure is intermeshed with the second crystal structure. In some examples, the alpha-type structure can comprise a hexagonal crystal phase, and the beta-type structure can comprise a body-centered cubic crystal phase.

Block 10500 of method 10000 can be optional, comprising coupling the face plate to a front end of the golf club head. In some examples, the golf club head can be similar to golf club head 10 as illustrated in FIG. 1. The faceplate can be coupled by mating a faceplate edge, such as faceplate edge 101 (FIGS. 1-2) to an opening at the front of the golf club head. In some examples, such mating can be achieved via a welding process and/or a brazing process.

In some examples, the cell lattice of the midsection, as formed in sub-block 10320, can be located in a central midsection area of the midsection, such that a perimeter midsection area of the midsection bounding the central midsection area can be devoid of the cell lattice and/or of its cells. As an example, the perimeter midsection area can be similar to perimeter midsection area 232 of midsection 230 bounding the central area of midsection 230 comprising cell lattice 240 (FIGS. 1-4). In some embodiments, perimeter midsection area 230 can separate the cell lattice 240 in the central midsection area away from faceplate edge 101 by at least approximately 0.1 inches (2.54 mm).

In the same or other examples, coupling the face plate in block 10500 can comprise coupling the front end of the golf club head to an inner skin perimeter area of the inner skin of block 10100, such as to inner skin perimeter area 212 (FIG. 2), or to an outer skin perimeter area of the outer skin of block 10200, such as to outer skin perimeter area 222 (FIG. 2), or to both. For instance, the inner skin perimeter area and/or the outer skin perimeter area can be aligned with the perimeter midsection area described above such as not to contact the cell lattice of the midsection central area. There can be other examples, however, where the cell lattice can extend throughout the midsection area of the faceplate, such that the inner and outer skin perimeter areas would thus contact the cell lattice.

The cell lattice formed in block 10320 can comprise one or more of several characteristics. For example, the plurality of cells of the cell lattice can be formed in a hexagonal pattern, such as seen in FIGS. 4 and 6-7 with respect to cell lattice 240. In the same or other examples, the cell lattice can be formed in an isogrid pattern, as also seen with respect to cell lattices 240 and 740. The cell lattice can comprise in the same or other examples a plurality of cell junctions where two or more of the plurality of walls couple together. For instance, the cell junctions can be similar to cell junction 443 (FIGS. 4, 6) and/or to cell junction 743 (FIG. 7). One or more of the cell junctions may comprise a junction channel extending from the inner midsection end to the outer midsection end of the midsection, such as junction channel 4431 extended from inner midsection end 245 to outer midsection end 246 through cell junction 443, as shown in FIG. 6.

Continuing with examples of the one or more several characteristics for the cell lattice in block 10320, there can also be embodiments where forming the cell lattice can comprise forming one or more walls of the cell lattice to comprise a varying dimension. As an example, the cell lattice can comprise a wall, such as one of walls 741 having varying length thickness dimensions (FIG. 7), and/or such as one of walls 841 and/or 1141 having varying depth thickness dimensions (FIGS. 8 and 11). In the same or other examples, forming the cell lattice can comprise forming the plurality of cells in a diminishing density pattern and/or in a diminishing size pattern. For instance, in the diminishing size pattern, the plurality of cells can decrease in size or dimension towards a target strike region of the face plate, such as shown and described with respect to FIGS. 17-18. In the diminishing density pattern, the plurality of cells can decrease in density towards the target strike region of the face plate.

In the same or other examples, the cell lattice can comprise one or more transverse passageways between adjacent cells of the cell lattice. As an example, the cell lattice can comprise transverse passageways as shown in FIG. 6, where transverse passageway 644 traverses through wall 6411 between adjacent cells of cells 242. In the same or other examples, the formation of the transverse passageways can be facilitated, for example, by the layered formation of midsection 230 (FIGS. 1-4, 6), where the features of transverse passageways such as transverse passageway 644 can be formed in block 10300 for each of midsection layers 330 prior to carrying out block 10400.

There can also be examples where a single faceplate can comprise a plurality of cell lattice regions, such as described with respect to FIGS. 19-22. In some examples, the cell lattice regions of the plurality of cell lattice regions can be similar to each other. In other examples, two or more of the cell lattice regions of the plurality of cell lattice regions can differ from each other with respect to at least one feature, such as in terms of stiffness, elasticity, and/or type of cell lattice comprised.

In some examples, one or more of the different blocks of method 10000 can be combined into a single block or performed simultaneously, and/or the sequence of such blocks can be changed. For example, the inner skin of block 10100 may be provided simultaneously with the midsection of block 10300, and/or the outer skin of block 10200 may be provided simultaneously with the midsection of block 10300. As another example, the sequence of sub-blocks 10321 and 10322 can be changed.

In the same or other examples, some of the blocks of method 10000 can be subdivided into several sub-blocks. For example, block 10500 may comprise a sub-block for fastening the face plate to the front end of the golf club head, and another sub-block for polishing the faceplate and/or the junction with the front end of the golf club head. There can also be examples where method 10000 can comprise further or different blocks. In addition, there may be examples where method 10000 can comprise only part of the steps described above. For instance, block 10500 can be optional in some examples. Other variations can be implemented for method 10000 without departing from the scope of the present disclosure.

Figure 23:
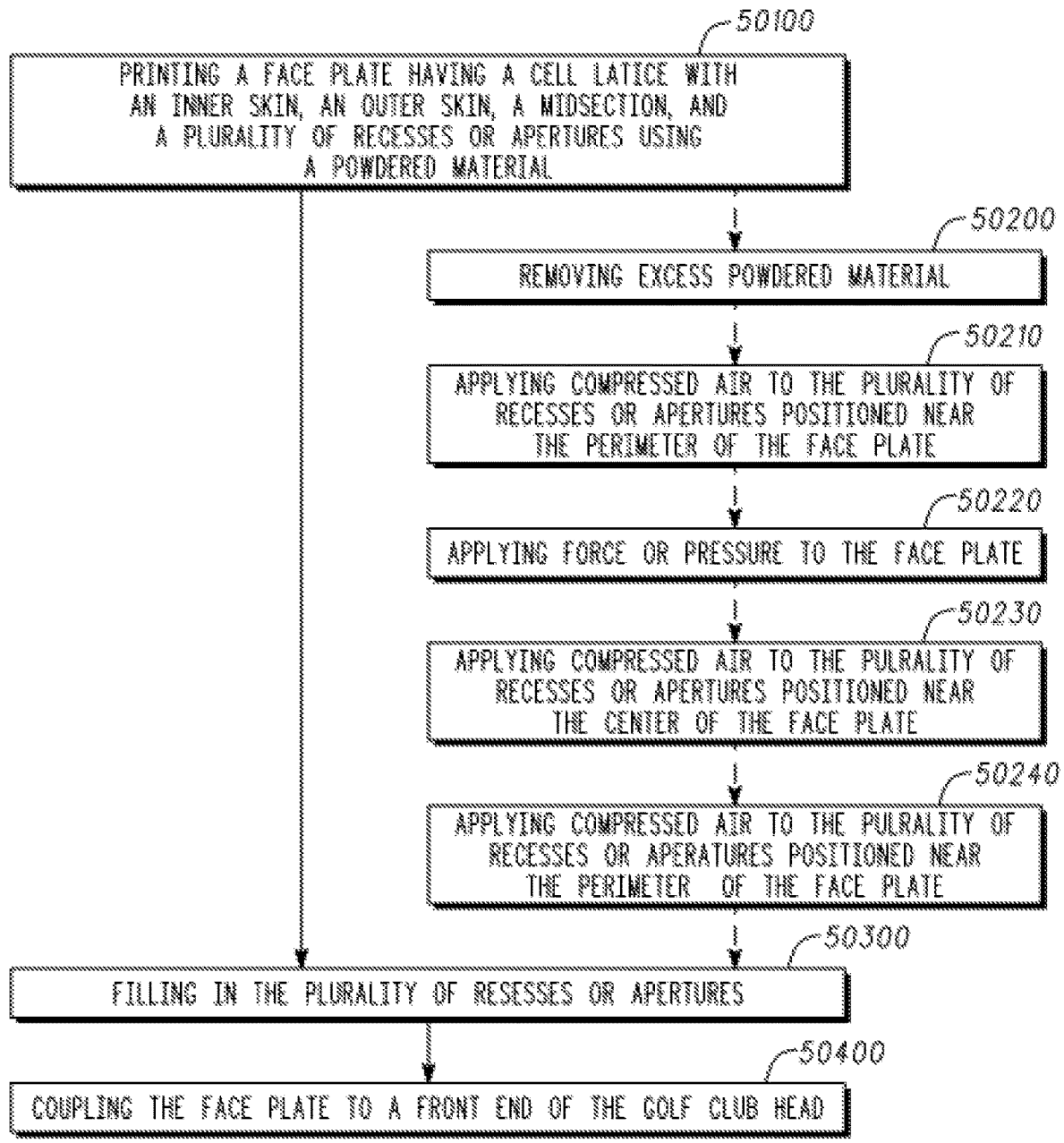
FIG. 23 illustrates a flow chart for a method of manufacturing a face plate for a golf club head.

FIG. 23 illustrates a flowchart for a method 50000 of manufacturing a face plate for a golf club head. In some embodiments, the face plate can be similar to face plate 100 (FIGS. 1-4, 6), and/or to a face plate comprising one or more cell lattices such as, for example, those described with respect to FIGS. 7-9, 11, 12-22, and/or 24-27).

Figure 24:
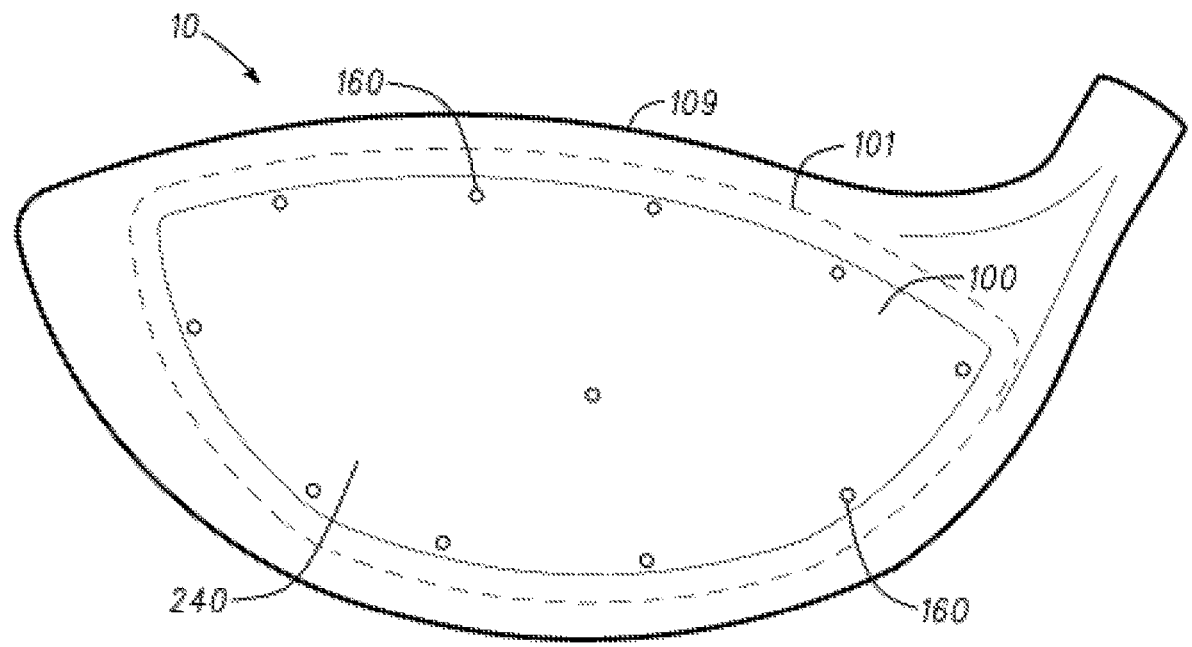
FIG. 24 illustrates a front perspective view of a golf club head comprising a face plate coupled to a club head body.

Block 50100 of method 50000 comprises printing a face plate or a portion of a face plate for a golf club head, the face plate or portion thereof having a cell lattice with an inner skin 210, an outer skin 120, a midsection 230, and a plurality of apertures 160 (shown in FIG. 24). Each of the plurality of apertures 160 can extend from a cell within the midsection of the cell lattice through the inner skin, from a cell within the midsection of the cell lattice through the outer skin, or from a cell within the midsection of the cell lattice through the outer skin of the face plate.

Referring to FIG. 24, the plurality of apertures can be positioned on the cell lattice to allow removal of excess powdered material of block 50100. In some examples, at least one of the plurality of apertures 160 is positioned near the center of the face plate or cell lattice region and additional apertures 160 are positioned toward or near the perimeter of the face plate or cell lattice region. For example, in the embodiment illustrated in FIG. 25, the plurality of apertures 160 includes an aperture positioned near the center of the face plate and additional apertures positioned around the perimeter of the cell lattice. In other embodiments, the plurality of apertures 160 can include more than one aperture positioned near the center of the face plate and additional apertures positioned around the perimeter of the face plate or cell lattice region. Further, in other embodiments, the plurality of apertures 160 can include one or more apertures positioned near the center of the face plate and additional apertures positioned around the perimeter of the cell lattice forming a perimeter channel 168, as illustrated in FIG. 26. Referring to FIG. 26, in the illustrated embodiment, the perimeter channel has a width ranging from approximately 0.03 to 0.05 inches. For example, the perimeter channel can have a width of approximately 0.03 inches, approximately 0.035 inches, approximately 0.04 inches, approximately 0.045 inches, or approximately 0.05 inches. In some embodiments, the perimeter channel can be positioned through the inner skin of the cell lattice. In other embodiments, the perimeter channel can be positioned through the outer skin of the cell lattice.

In some examples, the plurality of apertures 160 can be positioned through or on a side of the face plate having the inner skin. In some examples, the plurality of apertures 160 can be positioned through or on a side of the face plate having the outer skin. In some examples, some of the plurality of apertures 160 may be positioned through or on the side of the face plate having the inner skin and the remaining apertures 160 can be positioned through or on the side of the face plate having the outer skin.

In many embodiments, the diameter of the plurality of apertures 160 can range from approximately 0.005 inches to approximately 0.2 inches. In some embodiments, the diameter of the plurality of apertures 160 can range from approximately 0.025 inches to approximately 0.075 inches, from approximately 0.02 inches to approximately 0.10 inches, or from approximately 0.01 inches to approximately 0.15 inches. For example, in the illustrated embodiment, the diameter of the plurality of apertures 160 is approximately 0.05 inches. Further, in the illustrated embodiment, each of the plurality of apertures 160 has the same diameter. In other embodiments, each of the plurality of apertures can have different diameters.

In many embodiments, each of the plurality of apertures 160 are spaced apart from the remaining apertures by a distance greater than or equal to two times the diameter of the plurality of apertures. In other embodiments, each of the plurality of apertures can be spaced apart from the remaining apertures by a distance greater than or equal to three, four, five, or six times the diameter of the plurality of apertures.

In some examples, the face plate of block 50100 can be printed layer by layer using direct metal laser sintering. In other examples, the face plate can be printed using other processes such as, for example, selective laser sintering, 3D printing, stereolithography, laminated object manufacturing, fused deposition modeling, or electron beam melting. In some embodiments, the face plate having cell lattice (e.g. cell lattice 1840) cannot be formed using methods other than printing. For example, in many embodiments, the cells 1842 of cell lattice 1840 comprise dimensions that are too small to be cast. For further example, in many embodiments, the continuous cells 1842 of cell lattice 1840 prevent the usage of merging inner skin, midsection, and outer skin layers together, as this process requires continuity in midsection layers.

In some examples, the face plate can be printed using a powdered material. In some examples, the powdered material can be a powdered metallic material. In some examples, the powdered metallic material of block 50100 can be a titanium alloy comprising at least approximately 8% aluminum (by volume). In the same or other examples, the metallic alloy can comprise a titanium 8-1-1 alloy having approximately 8% aluminum, 1% vanadium and 1% chromium. In the same or other examples, the powdered metallic material of block 50100 can be a titanium alloy such as Ti-9S which contains 8% Al, 1% V, and 0.2% Si, with the remaining alloy composition being titanium and possibly some trace elements. In some embodiments, Ti-9S contains 6.5%-8.5% Al, between 1%-2% V, a maximum of 0.08% C, a maximum of 0.2% Si, a maximum of 0.3% Fe, a maximum of 0.2% O, a maximum of 0.05% N, trace amounts of Mo, and trace amounts of Sn, with the remaining alloy composition being titanium. Other materials may be used depending on their strength, considering their brittleness/elasticity as a beta-type crystal structure. For example, a titanium 6-4 alloy having approximately 6% aluminum and 4% vanadium, may be used in some embodiments, but can be from 5% to 12% less elastic than titanium 8-1-1 and may thus require further reinforcement or thickness for face plate 100 to properly withstand golf impact stresses.

Block 50200 of method 50000 comprises removing the excess powdered metallic material from the face plate printed in block 50100. In some examples, removing the excess powdered material can be accomplished using compressed air directed toward the plurality of apertures 160, as described below.

Block 50200 of method 50000 can comprise sub-block 50210 for applying compressed air to remove excess powdered material from the plurality of apertures 160. The compressed air can be directed toward the plurality of apertures 160 positioned on the perimeter of the face plate to create a void of excess powdered material around the perimeter of the face plate. In some examples, the compressed air may range in pressure from approximately 30-60 PSI (pounds per square inch).

Block 50200 of method 50000 can also comprise sub-block 50220 for applying force, pressure, or vibrations to the face plate to loosen excess powdered material within the cell lattice. In some examples, force or pressure can be applied to the face plate using a rubber mallet. In other examples, force or pressure can be applied to the face plate using any other method capable of loosening the excess powdered material within the cell lattice. In some examples, vibrations can be applied to the face plate in the form of ultrasonic vibrations. In other examples, any type of vibration capable of loosening excess powdered material within the cell lattice can be applied to the face plate. In some examples, vibrations can be applied to the face plate using a tumbler or shaker. In other examples, any method capable of apply vibrations to the face plate to loosen excess powdered material can be used.

Block 50200 of method 50000 can also comprise sub-block 50230 for applying compressed air to the at least one aperture 160 near the center of the face plate. The compressed air directed toward the at least one aperture 160 near the center of the face plate pushes the excess loosened powdered material from the cell lattice toward the perimeter of the face plate. In some examples, the compressed air may range in pressure from approximately 30-60 PSI.

Block 50200 of method 50000 can also comprise sub-block 50230 for applying compressed air to the perimeter of the face plate to remove the excess loosened powered material shifted from the center of the face plate in the cell lattice to the perimeter of the face plate in sub-block 50230. In some examples, the steps in sub-blocks 50220 and 50230 can be repeated as necessary to remove any remaining excess powdered material from the cell lattice of the face plate.

The plurality of apertures 160 of the face plate in method 50000 function as a ventilation system to remove excess powdered material from the cell lattice of the face plate. The at least one aperture 160 near the center of the face plate aids in shifting the excess powdered material from the center of the face plate in the cell lattice toward the perimeter of the face plate in the cell lattice for simplified removal compared to a face plate devoid of at least one aperture 160 positioned near the center of the face plate.

Block 50300 of method 50000 can comprise filling in the plurality of apertures 160 with a material similar or identical to the material of the face plate. In some examples, the plurality of apertures 160 can be filled in by welding. In other examples, the plurality of apertures 160 can be filled in using other methods capable of filling the plurality of apertures 160 resulting in a face plate having flush inner and outer surfaces.

Block 50400 of method 50000 can be optional, comprising coupling the face plate or portion thereof to a front end of the golf club head. In some examples, the golf club head can be similar to golf club head 10 as illustrated in FIG. 1. In some examples (e.g. in examples where the entire face plate having the cell lattice is formed as a single component), the face plate can be coupled by mating a face plate edge, such as face plate edge 101 (FIGS. 1-2) to an opening at the front of the golf club head. In some examples, such mating can be achieved via a welding process and/or a brazing process. In examples where a portion of the face plate having the cell lattice is formed, the portion of the face plate can be coupled to a remainder of the face plate and/or the front of the golf club head via a welding and/or brazing process.

In the same or other examples, some of the blocks of method 50000 can be divided into several sub-blocks. There can also be examples where method 50000 can comprise further or different blocks. For example, a step including chemical dissolution can be performed after the step of block 50200 to remove any additional excess powdered material within the cell lattice. In some embodiments, chemical dissolution can be performed using an acidic liquid at an elevated temperature (such as approximately 37 degrees Celsius), the acid having a pH less than or equal to approximately 4.0, such as, for example, acetic acid, benzoic acid, carbonic acid, citric acid, hydrochloric acid, nitric acid, sulfuric acid, or any other acid having a pH less than or equal to approximately 4.0, or any other material capable of removing additional excess powdered material within the cell lattice. In some embodiments, chemical dissolution can be performed using isopropyl alcohol or any other liquid capable of excess powdered material within the cell lattice.

For further example, method 50000 can further include an additional step comprising bending the face plate to incorporate bulge. In some examples, bending the face plate can be performed after forming the face plate with the cell lattice, but before coupling the face plate to the front end of the club head. In other embodiments, the face plate can be formed with bulge such that a secondary bending operation is not required. In these or other embodiments, the geometry of the cell lattice can be adjusted accordingly to allow the cell walls to extend at an angle less than or equal to approximately 45 degrees from a vertical axis when the face plate or portion thereof is formed by printing, wherein the vertical axis is positioned perpendicular to a plane defined by a layer of printed material.

In the same or other examples, method 50000 can comprise only part of the steps described above. For instance, block 50400 can be optional in some examples. Further, there may be examples where steps of method 50000 can be performed in different sequences. For instance, in some examples, block 50400 can be performed before block 50300. Other variations can be implemented for method 50000 without departing from the scope of the present disclosure.

Although the golf club face plates with internal cell lattices and related methods herein have been described with reference to specific embodiments, various changes may be made without departing from the spirit or scope of the present disclosure. For example, although golf club head 10 is illustrated in FIG. 1 as a driver club head, the disclosure herein is also applicable to other types of golf club heads, such as fairway woods, hybrids, and even club heads without internal cavities such as putters and irons. Additional examples of such changes have been given in the foregoing description. Other permutations of the different embodiments having one or more of the features of the various figures are likewise contemplated. Accordingly, the specification, claims, and drawings herein are intended to be illustrative of the scope of the disclosure and is not intended to be limiting. It is intended that the scope of this application shall be limited only to the extent required by the appended claims.

The golf club face plates with internal cell lattices and related methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

Clause 1: A golf club head comprising a face plate having an inner skin, an outer skin, a cell lattice with a plurality of walls having a plurality of axes extending centrally through the walls between the inner skin and the outer skin, wherein the walls extend from the axes at an angle less than or equal to approximately 45 degrees, and the walls intersect adjacent walls at a single, first point near inner skin and at a single, second point near outer skin, a wall thickness that varies relative to position from the inner skin and the outer skin, and a plurality of cells defined by the plurality of walls, the plurality of cells positioned between the inner skin and the outer skin and having a cell width that varies relative to position from the inner skin and the outer skin.

Clause 2: The golf club head of clause 1, wherein the wall thickness is greater near the inner skin and the outer skin than near a central region of the cell lattice.

Clause 3: The golf club head of clause 1, wherein the minimum wall thickness ranges from 0.005 inches to 0.2 inches.

Clause 4: The golf club head of clause 1, wherein the maximum cell width ranges from 0.005 inches to 0.2 inches.

Clause 5: The golf club head of clause 1, wherein the thickness of the walls varies defining a plurality of hourglass shapes.

Clause 6: The golf club head of clause 1, wherein a center-to-center distance between adjacent axes ranges from 0.005 inches to 0.2 inches.

Clause 7: The golf club head of clause 1, wherein the axes are positioned radially from a center of the faceplate.

Clause 8: A cell lattice comprising an inner skin, an outer skin, a plurality of walls having a plurality of axes extending centrally through the walls between the inner skin and the outer skin, wherein the walls extend from the axes at an angle less than or equal to approximately 45 degrees, and a wall thickness that varies relative to position from the inner skin and the outer skin, a plurality of cells defined by the plurality of walls, the plurality of cells positioned between the inner skin and the outer skin, and a plurality of apertures for removal of excess material in the cell lattice, the plurality of apertures including at least a first aperture positioned near a center of the cell lattice and a the remaining apertures positioned around the perimeter of the cell lattice.

Clause 9: The cell lattice of clause 8, wherein the wall thickness is greater near the inner skin and the outer skin than near a central region of the cell lattice.

Clause 10: The cell lattice of clause 8, wherein the minimum wall thickness ranges from 0.005 inches to 0.2 inches.

Clause 11: The cell lattice of clause 8, wherein the maximum cell width ranges from 0.005 inches to 0.2 inches.

Clause 12: The cell lattice of clause 8, wherein the thickness of the walls varies defining a plurality of hourglass shapes.

Clause 13: The cell lattice of clause 8, wherein a center-to-center distance between adjacent axes ranges from 0.005 inches to 0.2 inches.

Clause 14: The cell lattice of clause 8, wherein the axes are positioned radially from a center of the cell lattice.

Clause 15: The cell lattice of clause 8, wherein the plurality of apertures is positioned through the inner skin of the cell lattice or through the outer skin of the cell lattice.

Clause 16: The cell lattice of clause 8, wherein the diameter of the apertures ranges from approximately 0.005 inches to 0.2 inches.

Clause 17: The cell lattice of clause 8, wherein each of the plurality of apertures are spaced apart from the remaining apertures by a distance greater than or equal to two times the diameter of the apertures.

Clause 18: A method of manufacturing a face plate of a golf club head comprising: printing at least a portion of a face plate having a cell lattice, the cell lattice including: an inner skin; an outer skin; a plurality of walls having a plurality of axes extending centrally through the walls between the inner skin and the outer skin, wherein the walls extend from the axes at an angle less than or equal to approximately 45 degrees; and a wall thickness that varies relative to position from the inner skin and the outer skin; a plurality of cells defined by the plurality of walls, the plurality of cells positioned between the inner skin and the outer skin; and a plurality of apertures for removal of excess material in the cell lattice, the plurality of apertures positioned through the inner skin or the outer skin, the plurality of apertures including at least a first aperture positioned near a center of the cell lattice and a the remaining apertures positioned around the perimeter of the cell lattice; removing excess powdered material from the cell lattice; and filling in the plurality of apertures.

Clause 19: The method of manufacturing the face plate of a golf club head of clause 18, wherein removing excess powdered material includes applying compressed air to the plurality of apertures positioned near the perimeter of the cell lattice, applying force or pressure to the face plate, and applying compressed air to the plurality of apertures positioned near the center of the cell lattice.

Clause 20: The method of manufacturing the face plate of a golf club head of clause 18, wherein the diameter of the apertures ranges from approximately 0.005 inches to 0.2 inches, and each of the plurality of apertures are spaced apart from the remaining apertures by a distance greater than or equal to two times the diameter of the apertures.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

As the rules to golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

While the above examples may be described in connection with a driver-type golf club, the apparatus, methods, and articles of manufacture described herein may be applicable to other types of golf club such as a fairway wood-type golf club, a hybrid-type golf club, an iron-type golf club, a wedge-type golf club, or a putter-type golf club. Alternatively, the apparatus, methods, and articles of manufacture described herein may be applicable other type of sports equipment such as a hockey stick, a tennis racket, a fishing pole, a ski pole, etc.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:
1. A method for forming a golf club head comprising:
   providing a golf club head body wherein the body comprises an opening in a front end;

printing a face plate layer by layer having a cell lattice with an inner skin, an outer skin, a midsection, and a plurality of apertures using a powdered material;

wherein in the outer skin comprises at least a portion of a strike face of the golf club head;

wherein the cell lattice comprises a plurality of cells;

wherein each of the plurality of apertures extends from a cell within the midsection of the cell lattice;

wherein each of the plurality of apertures extends through the inner skin, or through the outer skin of the face plate;

positioning the plurality of apertures to allow removal of excess powered material;

applying force, pressure, or vibrations to loosen excess powered material within the cell lattice;

applying compressed air to the plurality of apertures to remove excess powdered material;

filling in the plurality of apertures resulting in a face plate having flush inner and outer surfaces; and coupling the face plate to the opening in the front end of the golf club head body;

wherein the plurality of apertures include at least a first aperture positioned near a center of the cell lattice and remaining apertures positioned around a perimeter of the cell lattice;

wherein applying force, pressure, or vibrations to loosen excess powered material within the cell lattice further comprises striking the face plate with a rubber mallet, applying ultrasonic vibrations, or shaking the face plate with a tumbler or shaker.

2. The method of claim 1, wherein each of the plurality of cells further comprise cell walls having a wall thickness.

3. The method of claim 2, wherein the wall thickness is greater near the inner skin and the outer skin than near a central region of the cell lattice.

4. The method of claim 3, wherein a minimum wall thickness ranges from 0.005 inches to 0.2 inches.

5. The method of claim 1, wherein each of the plurality of cells further comprise a cell width; and
wherein a maximum cell width ranges from 0.005 inches to 0.2 inches.

6. The method of claim 1, wherein applying compressed air to the plurality of apertures further comprises first applying compressed air to the remaining apertures positioned around a perimeter of the cell lattice and then applying compressed air to the at least a first aperture positioned near a center of the cell lattice; and
repeating the application of compressed air to the perimeter and center apertures as needed to remove any excess powered material.

7. The method of claim 1, wherein each of the plurality of apertures are spaced apart from the remaining apertures by a distance greater than or equal to two times a diameter of the plurality of apertures.

8. The method of claim 1, wherein the powdered material is selected from a group consisting of Ti-9S, Ti-6-4, and Ti-8-1-1.

9. The method of claim 1, wherein printing the face plate comprises using direct metal laser sintering, 3D printing, stereolithography, fused deposition, or electron beam melting to print each layer.

10. The method of claim 2, wherein the cell walls further comprise transverse passageways between at least two adjacent cells of the plurality of cells.

11. A method for forming a golf club head comprising:
providing a golf club head body comprising an opening in a front end;
printing a face plate having a cell lattice with an inner skin, an outer skin, a midsection, and a plurality of apertures using a powdered material;
wherein in the outer skin comprises at least a portion of a strike face of the golf club head;
wherein the cell lattice comprises a plurality of cells;
wherein each of the plurality of cells further comprise cell walls;
wherein the cell walls meet at cell junctions such that two or more cell walls couple together;
wherein each of the plurality of apertures extends from a cell within the midsection of the cell lattice;
wherein each of the plurality of apertures extends through the inner skin, or through the outer skin of the face plate;
positioning the plurality of apertures to allow removal of excess powered material;
applying force, pressure, or vibrations to loosen excess powered material within the cell lattice;
applying compressed air to the plurality of apertures to remove excess powdered material;
filling in the plurality of apertures resulting in a face plate having flush inner and outer surfaces; and
coupling the face plate to the opening in the front end of the golf club head body;
wherein the cell walls further comprise transverse passageways such that each cell is open to at least one other cell;
wherein applying force, pressure, or vibrations to loosen excess powered material within the cell lattice further comprises striking the face plate with a rubber mallet, applying ultrasonic vibrations, or shaking the face plate with a tumbler or shaker.

12. The method of claim 11, wherein the plurality of apertures include at least a first aperture positioned near a center of the cell lattice and remaining apertures positioned around a perimeter of the cell lattice.

13. The method of claim 11, wherein each of the plurality of cells further comprise cell walls having a wall thickness.

14. The method of claim 13, wherein the wall thickness is greater near the inner skin and the outer skin than near a central region of the cell lattice.

15. The method of claim 14, wherein a minimum wall thickness ranges from 0.005 inches to 0.2 inches.

16. The method of claim 11, wherein each of the plurality of cells further comprise a cell width; and
wherein a maximum cell width ranges from 0.005 inches to 0.2 inches.

* * * * *